(12) United States Patent
Solheim

(10) Patent No.: US 11,441,951 B2
(45) Date of Patent: Sep. 13, 2022

(54) APPARATUS AND METHODS FOR REMOTE MEASUREMENT OF SEA SURFACE TEMPERATURE

(71) Applicant: Fredrick S. Solheim, Boulder, CO (US)

(72) Inventor: Fredrick S. Solheim, Boulder, CO (US)

(*) Notice: Subject to any disclaimer, the term of this patent is extended or adjusted under 35 U.S.C. 154(b) by 493 days.

(21) Appl. No.: 16/602,170

(22) Filed: Aug. 21, 2019

(65) Prior Publication Data

US 2021/0055164 A1   Feb. 25, 2021

(51) Int. Cl.
| | | |
|---|---|---|
| *G01J 5/06* | (2022.01) | |
| *G01J 5/00* | (2022.01) | |
| *G01J 5/02* | (2022.01) | |
| *G01J 5/07* | (2022.01) | |
| *G01J 5/80* | (2022.01) | |
| *G01J 5/04* | (2006.01) | |
| G01J 5/068 | (2022.01) | |

(52) U.S. Cl.
CPC ............... *G01J 5/06* (2013.01); *G01J 5/007* (2013.01); *G01J 5/0037* (2013.01); *G01J 5/0275* (2013.01); *G01J 5/047* (2013.01); *G01J 5/07* (2022.01); *G01J 5/804* (2022.01); G01J 5/068 (2022.01)

(58) Field of Classification Search
CPC ...... G01J 5/06; G01J 5/804; G01J 5/07; G01J 5/0037; G01J 5/007; G01J 5/0275; G01J 5/047; G01J 5/068
See application file for complete search history.

(56) References Cited

U.S. PATENT DOCUMENTS

| | | | |
|---|---|---|---|
| 3,968,954 A | | 7/1976 | Casco et al. |
| 4,499,470 A | * | 2/1985 | Stacey ............... G01K 11/006 374/E11.003 |
| 10,268,783 B2 | | 4/2019 | Helber et al. |
| 2016/0274026 A1 | * | 9/2016 | Solheim ............... G01W 1/00 |
| 2017/0059279 A1 | * | 3/2017 | Houde-Walter ........ F41G 7/226 |

FOREIGN PATENT DOCUMENTS

| | | | | |
|---|---|---|---|---|
| CN | 108364264 A | * | 8/2018 | ............... G06T 5/00 |
| EP | 2613181 A1 | * | 7/2013 | ............ G01J 5/0803 |

OTHER PUBLICATIONS

Gillespie et al., Temperature/Emissivity Separation Algorithm Theoretical Basis Document, Mar. 1999, Version 2.4, NASA Contract NAS5-31372, pp. 1-61 (Year: 1999).*

\* cited by examiner

*Primary Examiner* — David P Porta
*Assistant Examiner* — Jeremy S Valentiner
(74) *Attorney, Agent, or Firm* — Harold A. Burdick

(57) ABSTRACT

Apparatus and methods are disclosed for highly accurate remote measurement of sea surface skin temperature. Thermal band 8 to 14 micron images of the surface of the ocean taken by a downward looking infrared camera are processed to determine the optimum segments of the image to utilize. The influence of contaminating reflection of the downwelling flux from the sky and other error sources are removed and from the data and/or otherwise corrected for making sea surface temperature accuracy within several tenths of a degree possible.

19 Claims, 22 Drawing Sheets

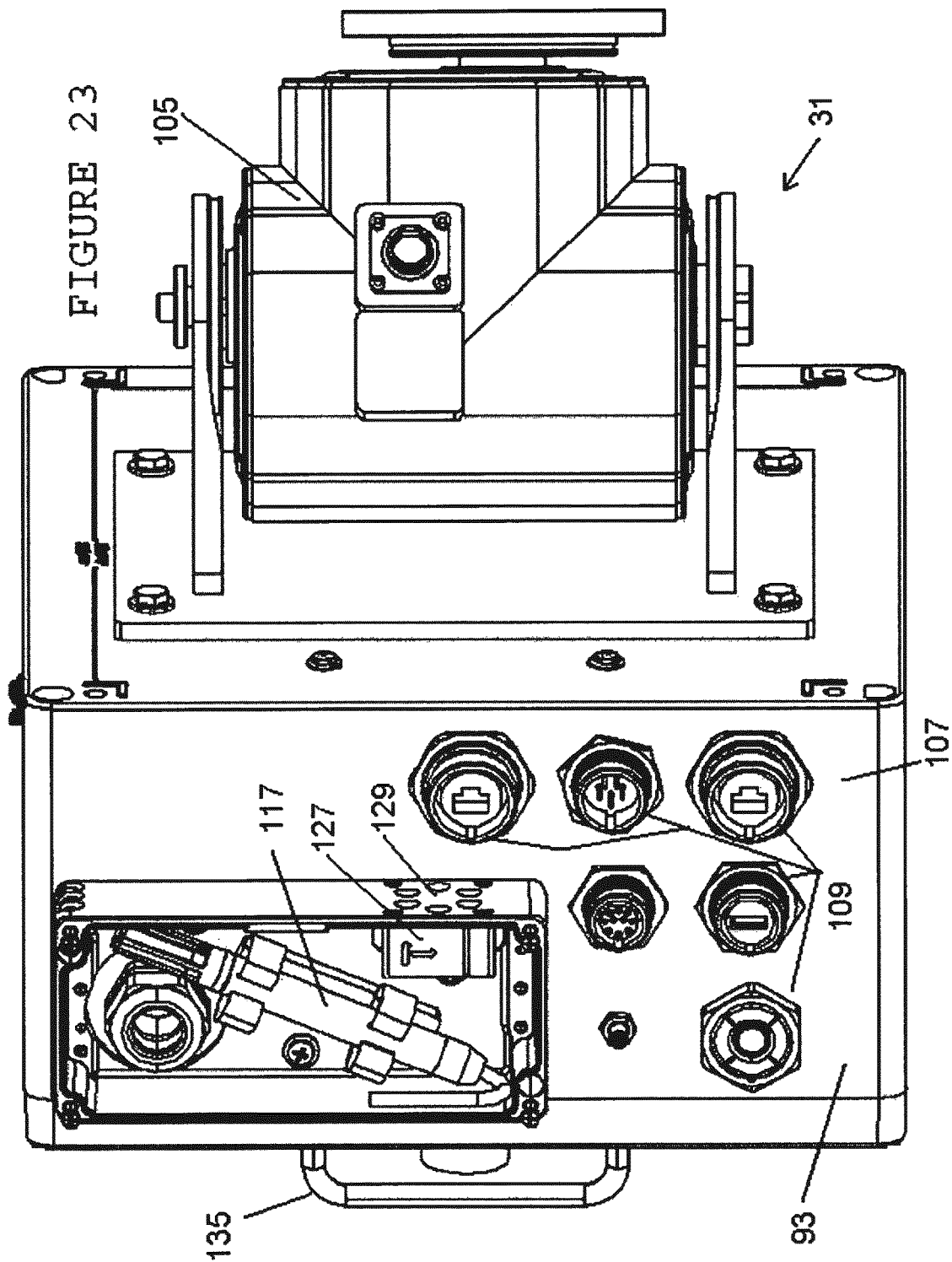

APPARATUS AND METHODS FOR REMOTE MEASUREMENT OF SEA SURFACE TEMPERATURE

GOVERNMENT SUPPORT

This invention was made with U.S. government support under contracts N00014-16-P3028 and N6833518 C0261 awarded by the United States Navy. The government has certain rights in the invention.

FIELD OF THE INVENTION

This invention relates to oceanographic and atmospheric temperature sensing and measurement, and, more particularly, relates apparatus and methods for sea surface temperature measurement.

BACKGROUND OF THE INVENTION

Sea surface (also known as sea surface skin) temperature provides fundamental information on the global climate system and ocean circulations. Because it affects the uptake of water into the atmosphere, sea surface temperature is an essential parameter in weather prediction and atmospheric model simulations of weather and climate patterns across the globe. Ocean circulations such as El Nino, La Nina and such circulations of all scales manifest in sea surface temperature features due to upwelling and sinking flows. Much of the heat trapped by increasing atmospheric greenhouse gas levels is emitted and absorbed by the ocean, causing ocean temperatures to rise. The longwave infrared fluxes involve only the first tens of microns of sea surface, giving importance to sea surface skin temperature.

Sea surface emissivity needs to be known within about 0.5% to be able to retrieve sea surface temperature with an accuracy of 0.3 K. Sea surface temperature is not only a crucial parameter for weather and climate studies and operational forecasting, it is also a boundary condition for radiatively retrieving many other geophysical variables such as salinity. In that regard, the sea surface emissivity is a cornerstone parameter required for remote sensing over the oceans.

Current well known and utilized sea surface temperature measurement systems include in situ measurement probes, seafaring ship seawater inlet temperature measurement, non-contact infrared thermometers including the Infrared Sea Surface Temperature Autonomous Radiometer (ISAR), the NOAA sea snake, satellite observations, wave gliders, tethered and drift buoys, and the like. Each has its advantages, but all remain deficient in some regards.

In particular, many heretofore known measurement systems typically measure below the sea surface and are thus not accurate measures of sea surface skin temperature. In some case measurements are accomplished by single pixel noncontact thermometers pointed to the sea surface. Here the large (several degree) field of view (FOV) contains many wave slopes and therefore highly variable sea temperature emission and sky reflection. This same deficiency applies also to satellite sea surface temperature measurements where the large variation in sea slope and unknown sea state, and their emission and reflection in the wide footprint of the satellite instrument, bias the sea surface temperature measurement by unknown amounts. This bias is generally greater with higher sea states. Sufficiently accurate sea surface temperature cannot therefore be extracted from such observations.

The amplitude of the upwelling flux emitted by the sea is a strong function of incidence angle, the ray angle measured from the normal to the surface. The downwelling flux from the sky contributes to this upwelling measurement as a function if incidence and reflection angles in accord with the Fresnel equations, inducing a bias to sea surface temperature measurement that cannot be effectively removed using heretofore known systems. This reflected contribution can be several degrees, with accompanying uncertainty. The resultant measurement of the current methods can be in error by many degrees in temperature, whereas needed accuracy for different applications is often as definitive as 0.1 C.

FIG. 1 is a long wave thermal band infrared (8 to 14 micron) image of the oceanic surface taken from the work deck of a research vessel in sea state 1 and low 2. The camera FOV is 25 by 18 angular degrees and the center of the image is at a 30 angular degree off nadir. As the incidence angle increases (angle off zenith) toward the upper part of the image, the emitted flux from the sea decreases and the cold sky flux increases in accord with the Fresnel Equations for electromagnetic behavior across a dielectric boundary. The pixel temperatures range from about 2 to 16 degrees Celsius.

By the Fresnel equations, the increase in incidence angle causes increased reflection of the cold sky and less emission of the ocean, thus the colder temperatures in the upper area of the image. Increased cold sky reflection can also be seen in the wave surface structure. The warmest pixel in the image is 18.11 C and the coldest is 9.31 C. This demonstrates how critical it is to accurately correct out the downwelling flux and determine emitted flux. In this example FIG. 1 the warmest pixel in the image is where the downwelling sky flux contribution is at a minimum and the sea emission is at a maximum.

FIG. 2 is a plot of the 240 pixel temperatures within the narrow 1.2×1.2 degree box in FIG. 1. The Y-axis is the blackbody temperature of pixels in the sea surface infrared temperature image in degrees Celsius. The X-axis is the image column of the sorted brightness temperatures of the pixels in the sea surface image. This FIGURE demonstrates the high variability of sea surface temperature captured by forward looking infrared (FLIR) camera temperature observations across even a narrow FOV. The thermal resolution of the infrared camera is 0.03 C, and absolute accuracy is 0.3 C. The 1.2 by 1.2 degree box in the lower center of FIG. 1 emulates the FOV of the ISAR shipboard sea surface temperature instrument. Pixel rows are plotted against column in the raster data file. Sea state is 1 or low 2. The average temperature in this FOV is 286.36K and the span of temperatures is 4.8 C likely influenced by variation of incidence angles reflecting more or less cold sky and sea surface emission. This plot thus suggests the strong dependence of sea surface temperature upon the incidence angle of observation even over small areas of the sea.

SUMMARY OF THE INVENTION

The apparatus and methods of this invention overcome the deficiencies of currently utilized methods of measuring sea surface (skin) temperature. The methods and apparatus accurately remotely (from the deck railing of a ship, for instance) determine the sea surface temperature utilizing a compact automatic (thus unattended) marine-worthy system. This invention largely overcomes the error and bias of current sea surface temperature remote measurements.

The instant apparatus and methods provide the capability for rapid capture of measurements in a plurality of pixels whose field-of-view (FOV) widths are a fraction of a degree, spanning only a few millimeters of wave surface. Thus, pixels each view in a wave across a very small and nearly constant or flat portion of the wave surface, and therefore sample a single thermal value of upwelling fluxes. In this way the pixel(s) are minimally contaminated with sky flux reflection to be determined, and the emission from the sea and the reflected flux from the sky can be more accurately known and corrected for to allow determination of the blackbody temperature of the sea surface.

The apparatus includes a closely calibrated passive non-contact infrared thermal 8 to 14 micron band multi-pixel camera capable of capturing a plurality of pixels in each captured image of its field of view. These thermal bands are well suited for this measurement, as the emissions come from approximately the first 10 microns of sea surface depth, making it a true sea surface skin temperature measurement. While any infrared thermal band could be used provided it measures thermal emission, the 8 to 14 micron band is optimum because of availability of highly resolute and accurate low cost cameras and minimal contamination of intervening atmosphere. The camera is calibrated to express the thermal blackbody temperature of each of the pixels. The methods of this invention include directing the field of view of the camera to the ocean surface at a known incidence angle. The majority of the received thermal flux is emitted from the first several microns of the sea surface "skin" and is the sea surface temperature. A component of the received thermal radiation is a variable flux from sky reflected from the varying wave surface angles in the field of view. The flux emitted from the sea surface and the reflected sky flux in each pixel are dependent upon the angle of the wave surface viewed in each pixel, the "look" angle of the of the infrared camera onto the wave surface in each pixel, and angle of the reflected view of the sky in each pixel. These angles are known by the elevation angle of the infrared camera and the so-called Fresnel's Equations that define angles of emission and reflection across a dielectric interface.

Methods are utilized to correct out the reflected sky flux, isolating the true sea surface temperature. This includes methods to determine the downwelling sky flux and methods to determine the angular relations of the incident and reflected flux vectors. Features are implemented to withstand shipboard marine environment and analyses are utilized in determining the magnitude of sensitivity of sea surface temperature determination to various parameter and measurement difficulties and sources of error. Thus passive determinations of sea surface temperature accurate to about 0.3 C are enabled.

The methods of this invention for remote measurement of sea surface temperature include capturing a multi-pixel image in selected wavebands of a small area of sea surface at a selected incidence angle. Each pixel of the image should thus encompass a fraction of a degree field-of-view width. Blackbody thermal values of the pixels are sorted, from warmest to coolest, and coordinates of the warmest pixels relative to position of image capture and nadir angle thereto are located. A determination of incidence and reflected angles from a selected warmest pixel is made. Downwelling infrared flux in the wavebands and at the incidence angle is determined and utilized to correct calculation of true sea surface temperature.

Preferably a passive noncontact infrared thermal 8 to 14 micron band multi-pixel camera capable of capturing a plurality of pixels in each captured image of its field of view is calibrated to express thermal blackbody temperature of each of the pixels. The field of view of the camera is directed to the sea surface at a known incidence angle and an image or images thereof are captured, data indicative thereof sent to a processor. Angle of a viewed wave surface in each pixel, view angle of the of the infrared camera onto the wave surface in each pixel, and angle of the reflected view of the sky in each pixel are utilized to determine the flux emitted from the sea surface and reflected sky flux in each pixel at the processor. Corrected sea surface skin temperature is obtained at the processor by separating the values of emitted flux from the first several microns of the sea surface skin and values of variable flux from sky reflected from the wave surface angles in the field of view of the camera in a selected pixel and processed accordingly.

The apparatus of this invention for remote measurement of sea surface temperature from a selected viewing platform includes a multi-pixel infrared camera, for example as described above, mounted in a hermetic enclosure together with a signal storage and processing unit in communication with the camera. An inertial measuring unit is mounted in the enclosure and in communication with the storage and processing unit and connected for receipt of GNSS position and velocity and determination of platform movement. A surface temperature and relative humidity probe is mountable with the enclosure and is also in communication with the storage and processing unit, as is a pan-tilt positioner which is operationally responsive to the storage and processing unit.

It is therefore an object of this invention to provide apparatus and methods for remote measurement of sea surface temperature that overcomes error and bias of current sea surface temperature remote measurements.

It is another object of this invention to provide apparatus and methods for remote measurement of sea surface temperature that utilizes capture of a plurality of pixels having a large number of temperature measurements due to the range of incidence angles, and whose field-of-view widths are a fraction of a degree, each spanning only a few millimeters of wave surface and thus measuring a singular value of upwelling flux.

It is still another object of this invention to provide methods for remote measurement of sea surface temperature including steps to correct for reflected sky flux and to thereby isolate true sea surface temperature, to determine the downwelling sky flux, to determine the angular relations of the incident and reflected flux vectors, and to determine magnitude of sensitivity of sea surface temperature determination to various parameter and measurement difficulties and sources of error.

It is yet another object of this invention to provide apparatus and methods for remote measurement of sea surface temperature capable of sea surface temperature determinations accurate to about 0.3 C.

It is yet another object of this invention to provide compact automatic apparatus for shipborne remote measurement of sea surface temperature.

It is still another object of this invention to provide apparatus for remote measurement of sea surface temperature that includes a closely calibrated passive noncontact infrared thermal 8 to 14 micron band multi-pixel camera capable of capturing a plurality of pixels in each captured image of its field of view.

It is another object of this invention to provide methods for remote measurement of sea surface temperature comprising the steps of capturing a multi-pixel image in selected wavebands of a small area of sea surface at a selected incidence angle, each pixel of the image having a fraction of a degree field-of-view width, sorting blackbody thermal values of the pixels, from warmest to coolest, locating coordinates of the warmest pixels relative to position of image capture and nadir angle thereto, determining incidence and reflected angles from a selected warmest pixel, and determining downwelling infrared flux in the wavebands and at the incidence angle and utilizing determination of downwelling infrared flux to correct calculation of true sea surface temperature.

It is still another object of this invention to provide methods for highly accurate measurement of physical temperature of sea surface skin comprising the steps of calibrating a passive noncontact infrared thermal 8 to 14 micron band multi-pixel camera capable of capturing a plurality of pixels in each captured image of its field of view to express thermal blackbody temperature of each of the pixels, directing the field of view of the camera to the sea surface at a known incidence angle and capturing an image or images thereof and sending data indicative thereof to a processor, utilizing angle of a viewed wave surface in each pixel, view angle of the of the infrared camera onto the wave surface in each pixel, and angle of the reflected view of the sky in each pixel to determine the flux emitted from the sea surface and reflected sky flux in each pixel at the processor, and obtaining corrected sea surface skin temperature at the processor by separating the values of emitted flux from the first several microns of the sea surface skin and values of variable flux from sky reflected from the wave surface angles in the field of view of the camera in a selected pixel and processing accordingly.

It is yet another object of this invention to provide apparatus for remote measurement of sea surface temperature from a selected viewing platform that includes a multi-pixel infrared camera mounted in a hermetic enclosure, a signal storage and processing unit mounted in the enclosure and in communication with the camera, an inertial measuring unit mounted in the enclosure and in communication with the storage and processing unit and connected for receipt of GNSS position and velocity and determination of platform movement, a surface temperature and relative humidity probe mounted with the enclosure and in communication with the storage and processing unit, and a pan-tilt positioner connectable to the enclosure and in communication with and operationally responsive to the storage and processing unit.

With these and other objects in view, which will become apparent to one skilled in the art as the description proceeds, this invention resides in the novel construction, combination, and arrangement of parts and methods substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which:

FIG. 23 is an end view of the preferred embodiment of the apparatus of this invention shown in FIG. 19.

DESCRIPTION OF THE INVENTION

Figure 3:
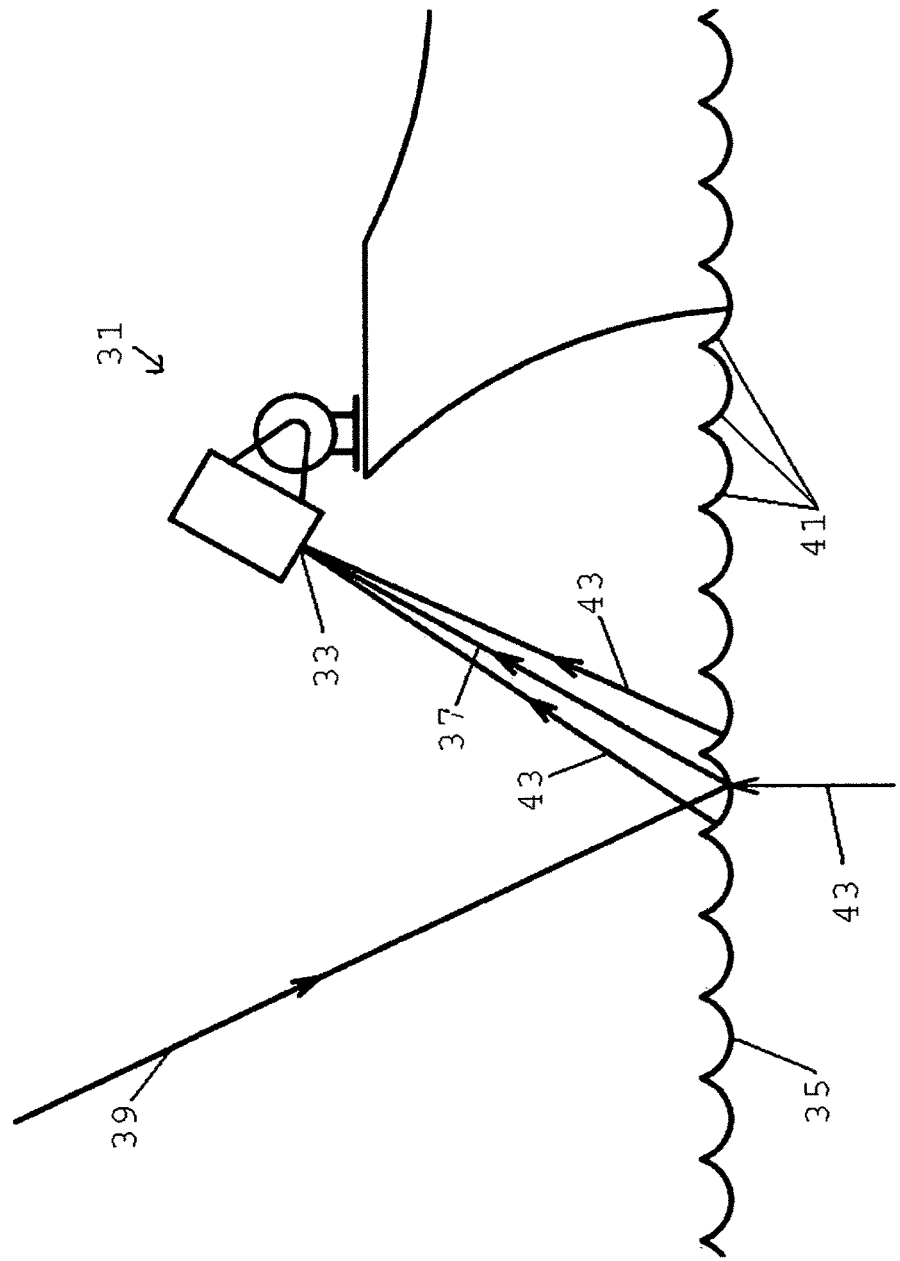
FIG. 3 illustrates the apparatus of this invention mounted on a ship's bow and pointed seaward in front of the passage of the ship.

FIG. 3 depicts the sea-viewing measurement apparatus of this invention. Infrared camera system 31 is preferably located on a suitable location of a sea going vessel or structure. In use on ships, the bow area is preferred location to observe the sea surface undisturbed by the motion of the ship that stirs and mixes the water. Camera 33 is pointed downward to sea surface 35 to capture an image of the surface. The camera pixels are calibrated in equivalent blackbody temperature of the received flux. This flux includes a small contribution from reflected flux 37 from downwelling sky radiation 39. The pixels in the image originate from varying slopes of the waves 41 on the sea surface, and contain differing amounts of upwelling emission from the sea 43 and the reflected sky flux 37 contribution, as defined by Fresnel's Equations.

Figure 4:
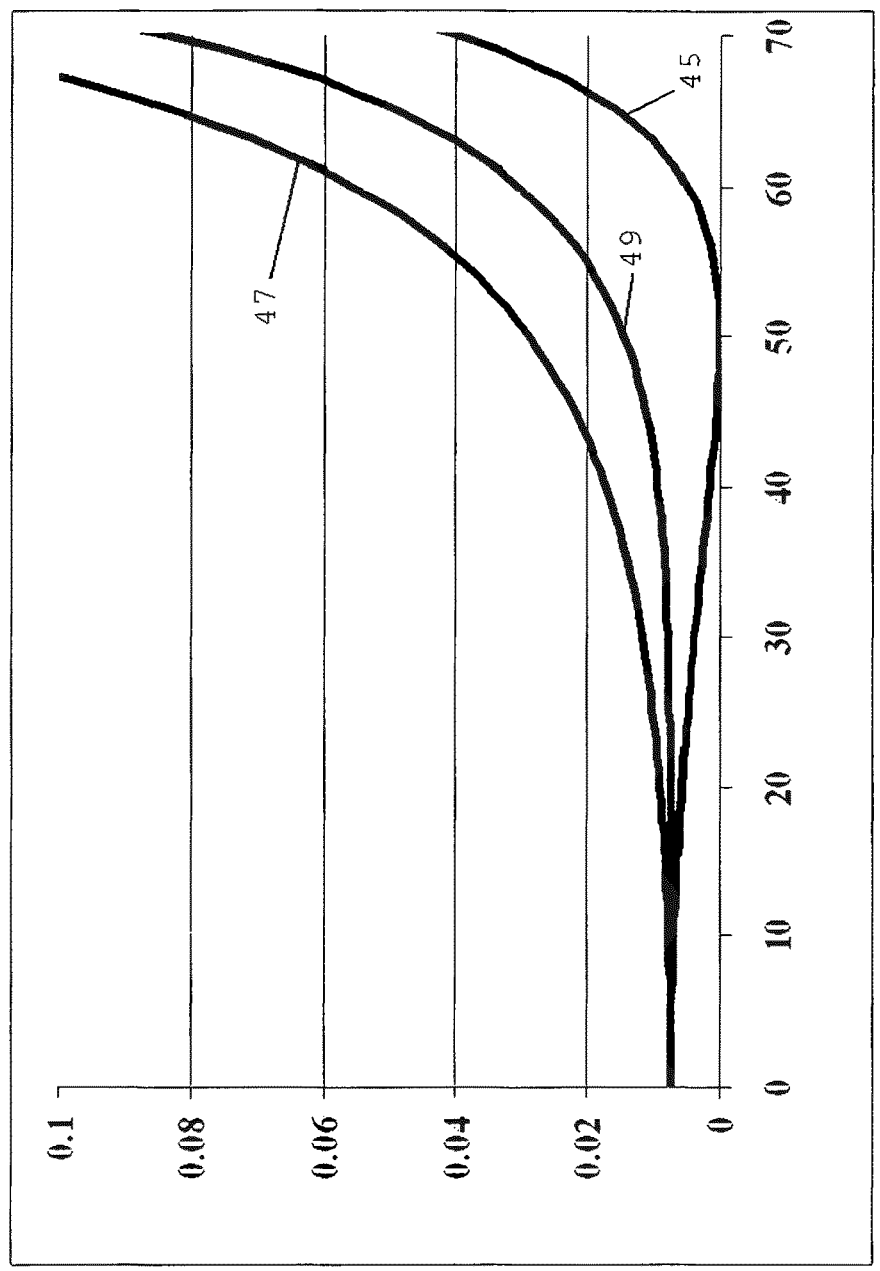
FIG. 4 illustrates selected data indicative of reflections from sea water for orthogonal polarizations of incident and reflected rays and the average thereof.

FIG. 4 illustrates data indicative of reflections from sea water for orthogonal polarizations in the plane of (45) and perpendicular to the plane of (47) the incident and reflected rays, and the average thereof (49). The X-axis represents the incidence angle while the Y-axis is the reflectance. The average reflection coefficient is constant from orthogonal out to 20 degrees of incidence angle.

Figure 5:
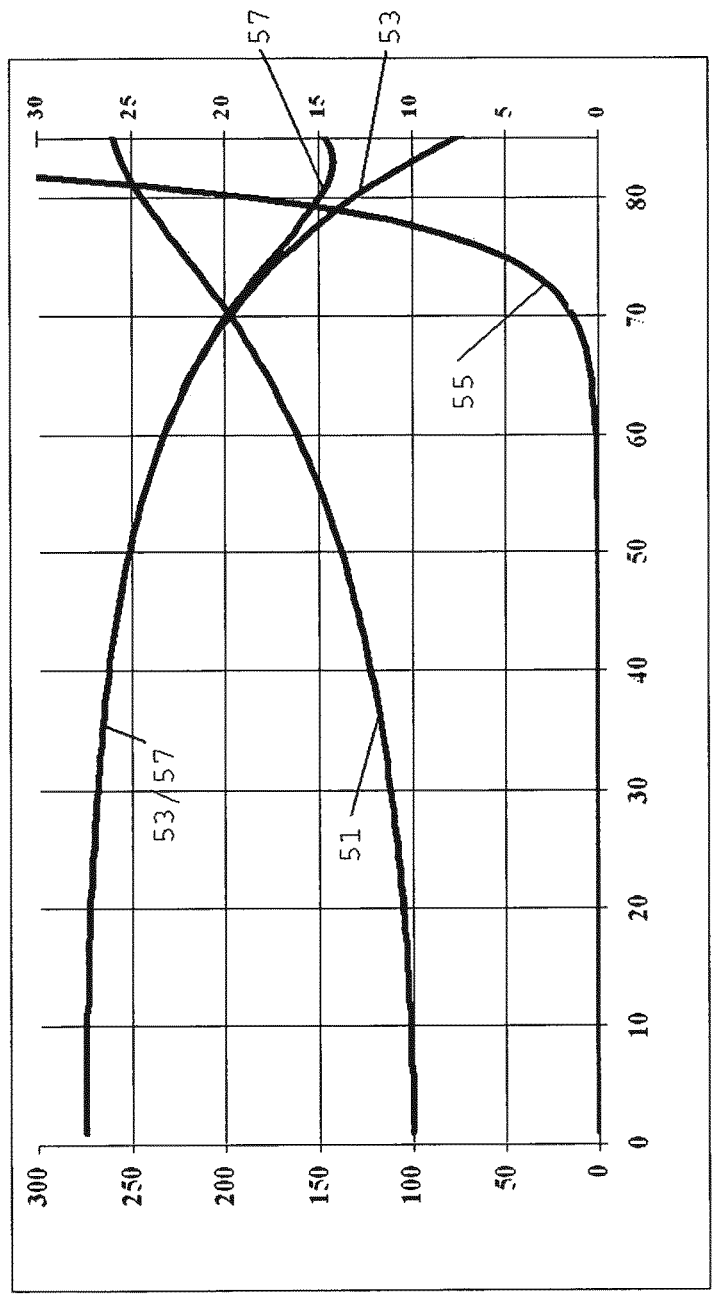
FIG. 5 illustrates data of Fresnel calculations of electromagnetic flux reflections and transmissions from a flat sea surface as a function of incidence angle.

Fresnel's Equations define the magnitude of the reflection and transmission of the vertical and horizontally polarized fluxes from and across the sea surface as a function of incidence angle. The observed thermal emission from the sea is dependent upon the viewing angle, and the downwelling flux from the sky is dependent upon the incident and reflected angles of this flux as defined by Fresnel's Equations for amplitude of the electromagnetic propagation (see FIG. 5 showing Fresnel calculation of fluxes (mapped sky temperature at 51, emission at 53, reflection at 55 and the total thereof at 57 in degrees K at the camera–Y-axis) from a flat sea as a function of incidence angle (X-axis) for 100K zenith sky and seawater n=1.186, wherein the increased reflection and decreased emission with increasing incidence angle work in concert to yield colder images of the sea as the FOV goes from nadir to horizon—see FIG. 1, left side):

$$R_\perp(\theta) = \left(\frac{n_1\cos\theta_i - n_2\cos\theta_t}{n_1\cos\theta_i + n_2\cos\theta_t}\right)^2 =$$

$$\left[\frac{n_1\cos\theta_i - n_2\sqrt{1-\left(\frac{n_1}{n_2}\sin\theta_i\right)^2}}{n_1\cos\theta_i + n_2\sqrt{1-\left(\frac{n_1}{n_2}\sin\theta_i\right)^2}}\right]^2 = \left(\frac{\sin(\theta_i - \theta_t)}{\sin(\theta_i + \theta_t)}\right)^2$$

$$R_\parallel(\theta) = \left(\frac{n_1\cos\theta_t - n_2\cos\theta_i}{n_1\cos\theta_t + n_2\cos\theta_i}\right)^2 =$$

$$\left[\frac{n_1\sqrt{1-\left(\frac{n_1}{n_2}\sin\theta_i\right)^2} - n_2\cos\theta_i}{n_2\sqrt{1-\left(\frac{n_1}{n_2}\sin\theta_i\right)^2} + n_2\cos\theta_i}\right]^2 = \left(\frac{\tan(\theta_i - \theta_t)}{\tan(\theta_i + \theta_t)}\right)^2$$

$$T_\perp(\theta) = (1 - sqrtR_\perp(\theta))^2 = \frac{4n_1n_2\cos\theta_i\cos\theta_t}{(n_1\cos\theta_i + n_2\cos\theta_t)^2} = \frac{2\sin\theta_t\cos\theta_i}{\sin(\theta_i + \theta_t)}$$

$$T_\parallel(\theta) = \frac{4n_1n_2\cos\theta_i\cos\theta_t}{(n_1\cos\theta_t + n_2\cos\theta_i)^2} = \frac{2\sin\theta_t\cos\theta_i}{\sin(\theta_i + \theta_t)\cos(\theta_i - \theta_t)}$$

$$\theta_t = \sin^{-1}\left(\frac{n_1\sin\theta_i}{n_2}\right)$$

The sea slope and the "look" angle of the infrared camera must be determined from the incidence angle of the wave location of the warmest pixel in the infrared camera image and the camera system. Any thermal band narrow pixel infrared camera can be utilized, provided it accurately measures equivalent blackbody temperatures and observes with a very narrow FOV. Since a high degree of accuracy of sea surface temperature measurement is desired (0.3 C or better), a number of parameter uncertainties and measurement errors need to be addressed.

Accurate knowledge of the above-referenced incidence angles is somewhat relaxed if incidence angles are small (near orthogonal). FIG. 4 shows the amplitude of reflection from the surface from sea water as a function of zenith angle. At orthogonal incidence, about 0.008 of the flux is reflected. The horizontal and vertical polarizations of the electric vector in the electromagnetic flux differ in reflection values as the zenith angle is increased. The average of these two polarizations is within 1% of the orthogonal value out to about 20 degrees of zenith angle. Most observations utilized for the sea surface temperature determination are within this 20 degree angle.

The blackbody temperatures seen by a LWIR camera at incidence angles from normal to grazing for an assumed 100K sky and 300K sea is shown in FIG. 5. Also shown are the contributing sky reflected (55) and sea emitted (53) fluxes to this camera measurement.

Figure 6:
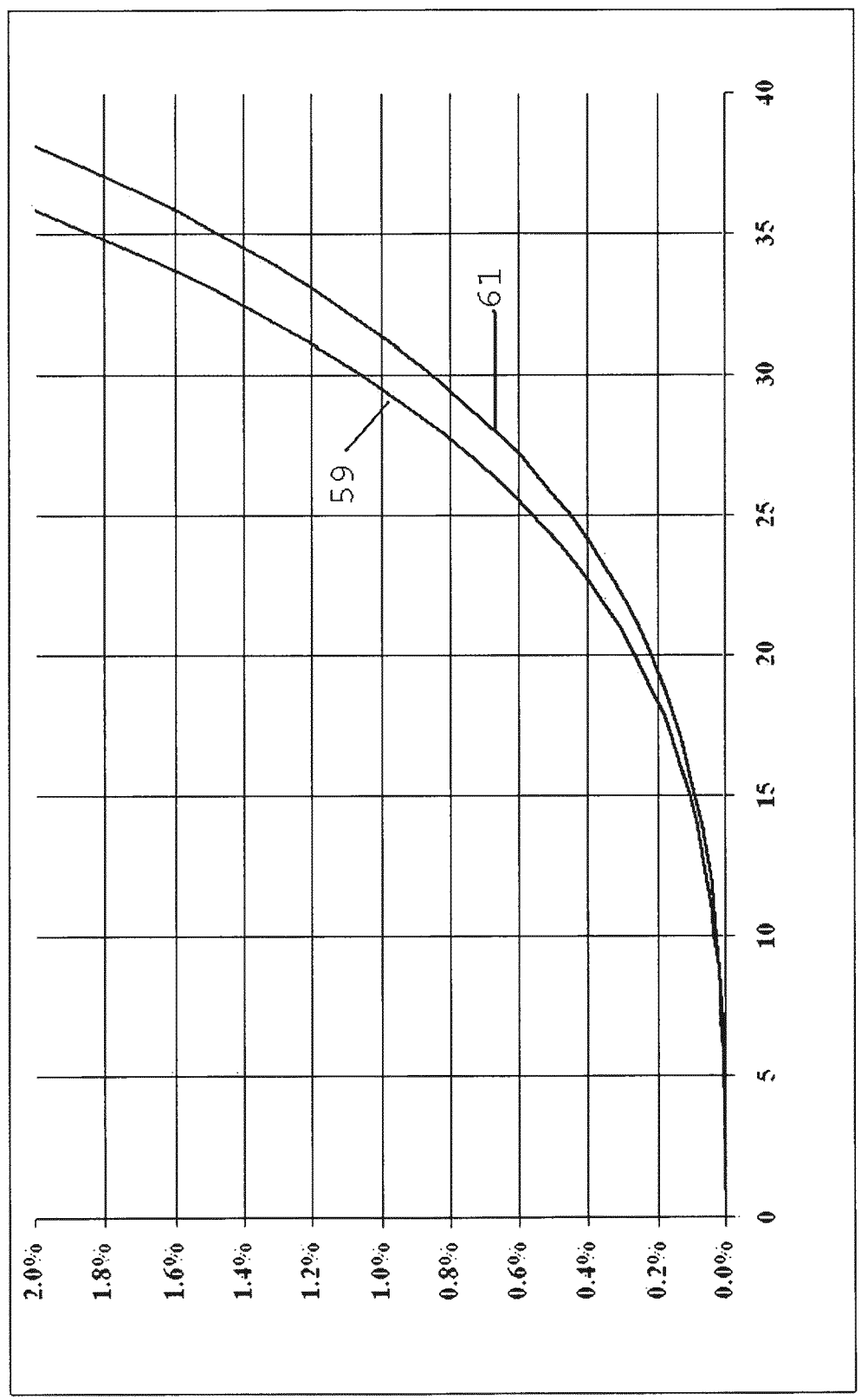
FIG. 6 is a plot of the sensitivity of seawater reflection coefficient to errors in measurement of incidence angle.

The error in brightness temperature induced by a 10 degree misestimation in incidence angles induces about a 0.04 C error in calculation in the reflected downward flux estimation, which when combined with a 0.1 C infrared camera error, results in a total error of 0.108 C, a small contribution. FIG. 6 presents the error induced by errors in determination of incidence angles of the downwelling sky flux and camera observation angle (X-axis is the incidence angle and the Y-axis is the reflection coefficient 1/R dr/d (theta) wherein 59 n=1.2 and 61 n=1.3).

It is required that the near-zenith downwelling flux, the blackbody temperature in the 8 to 14 micron window, be determined or estimated. Typical near-zenith temperatures might be as cold as 50 Kelvins, −223 degrees Celsius, well below the range of most all infrared cameras and noncontact thermometers. This temperature could be calculated from radiosonde or numeric weather model profiles of temperature and water vapor, and the flux calculated utilizing radiative transfer software.

Additionally, the sky flux is a small contribution to the infrared camera measured combined sky and sea surface temperature fluxes. Thus, some uncertainty is allowed in the angular measurements without significantly affecting the sea surface temperature determination. As seen in TABLE 2, the error in sea surface temperature determination is dominated by the uncertainty in the infrared camera measurement, about 0.3 degrees Celsius for the ICI 8640 camera of the preferred embodiment.

Figure 7:
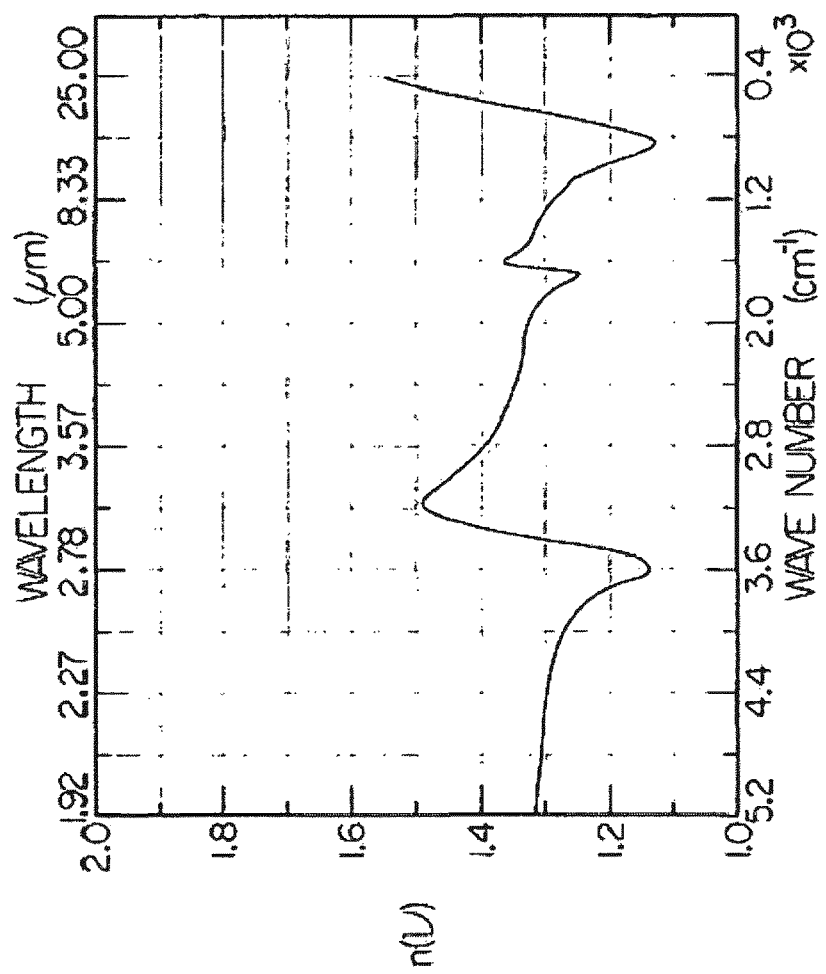
FIG. 7 is a laboratory measure of index of refraction in the thermal LWIR band.
Figure 8:
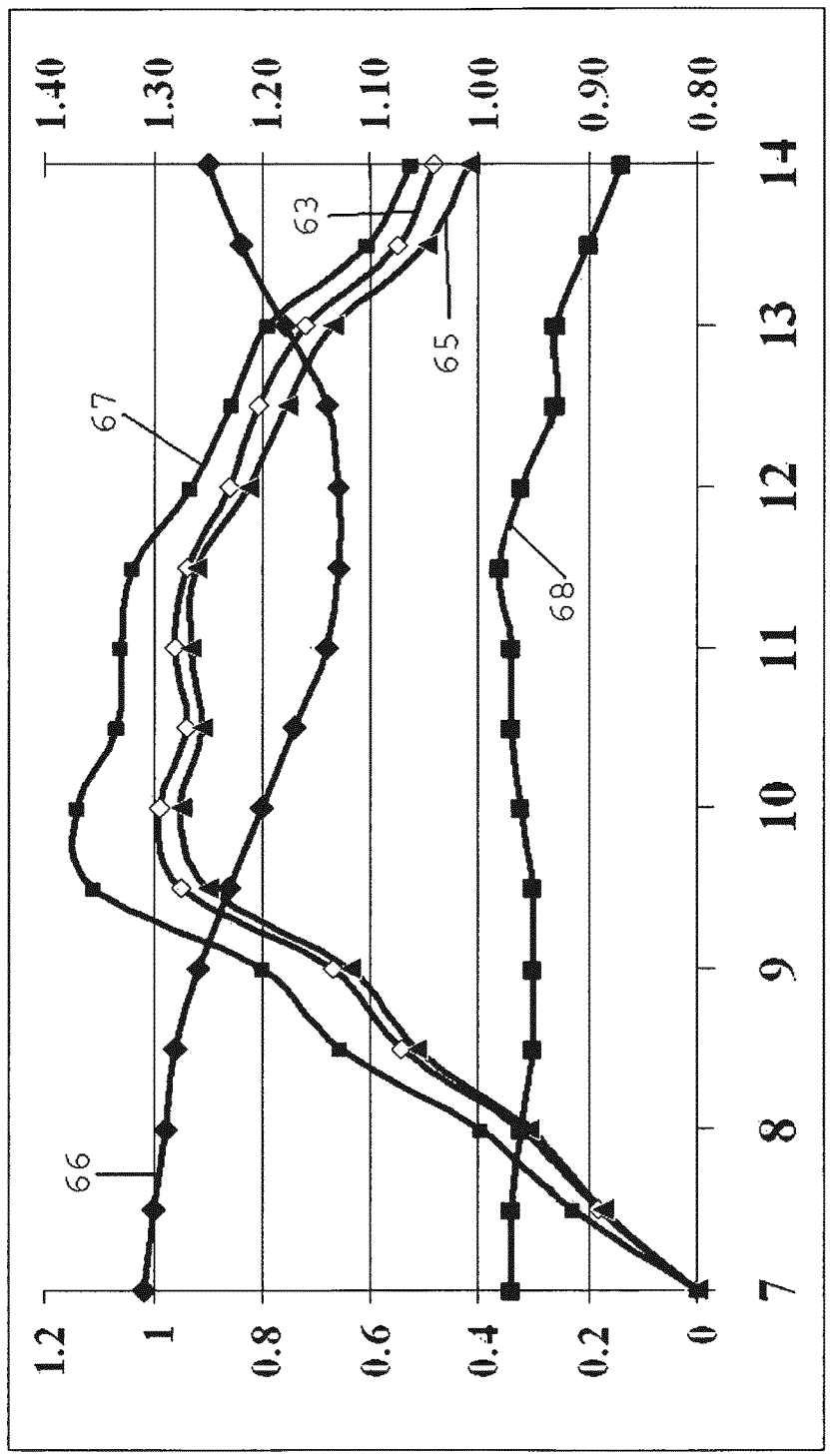
FIG. 8 is a mapping of the sensitivity and losses of the optical system against the index of refraction across the LWIR band.
Figure 9:
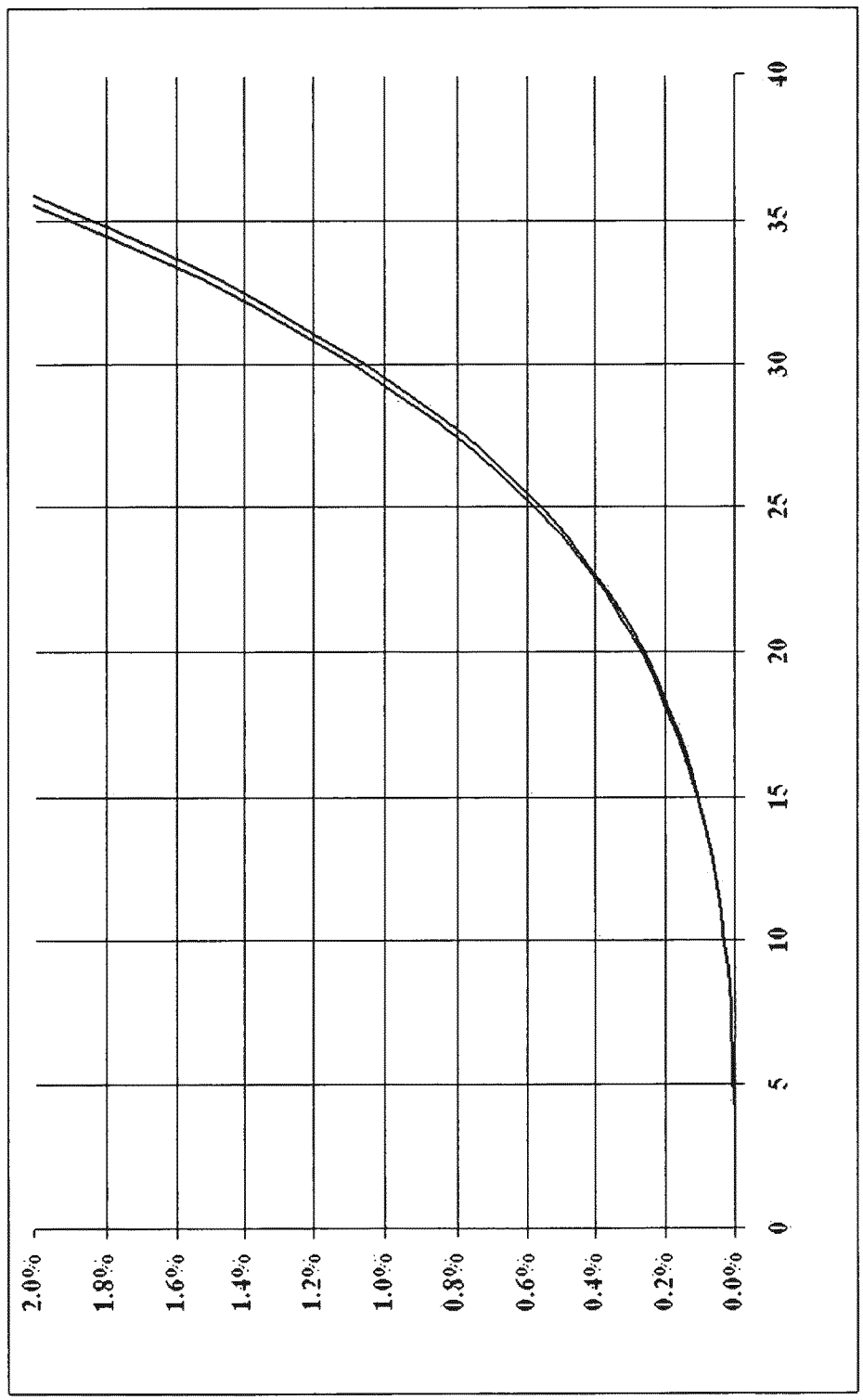
FIG. 9 is a plot of the fractional sensitivity of seawater reflection coefficient R to sea water index of refraction for a 0.01 misestimation of seawater index of refraction n.

As seen in FIG. 7, the index of refraction of sea water varies across the 8 to 14 micron (wave number 12.5 to 7 cm$^{-1}$) band from n=1.13 to =1.31. This variability must be mapped against the response of the infrared camera system. FIG. 8 shows the mapping of the band response (X-axis in microns) of an ICI 8640 infrared camera (63) viewing through an ICI germanium window (window transmission at 65) against the variable index of refraction (Y-axis 8640 mapped n left and window transmission n right). The n-seawater is at 66, mapped n is at 67 and window transmission is at 68, The effective seawater index of refraction is calculated to be n=1.186. Misestimation in this effective index of refraction results in errors shown by FIG. 9 wherein the X-axis is incidence angle theta and the Y-axis is index of refraction 1/R (d R/d n) per 0.01 change in n thereby illustrating fractional dependence of amplitude of reflection coefficient upon a 0.01 change in index of refraction as a function of incidence angle.

Figure 10:
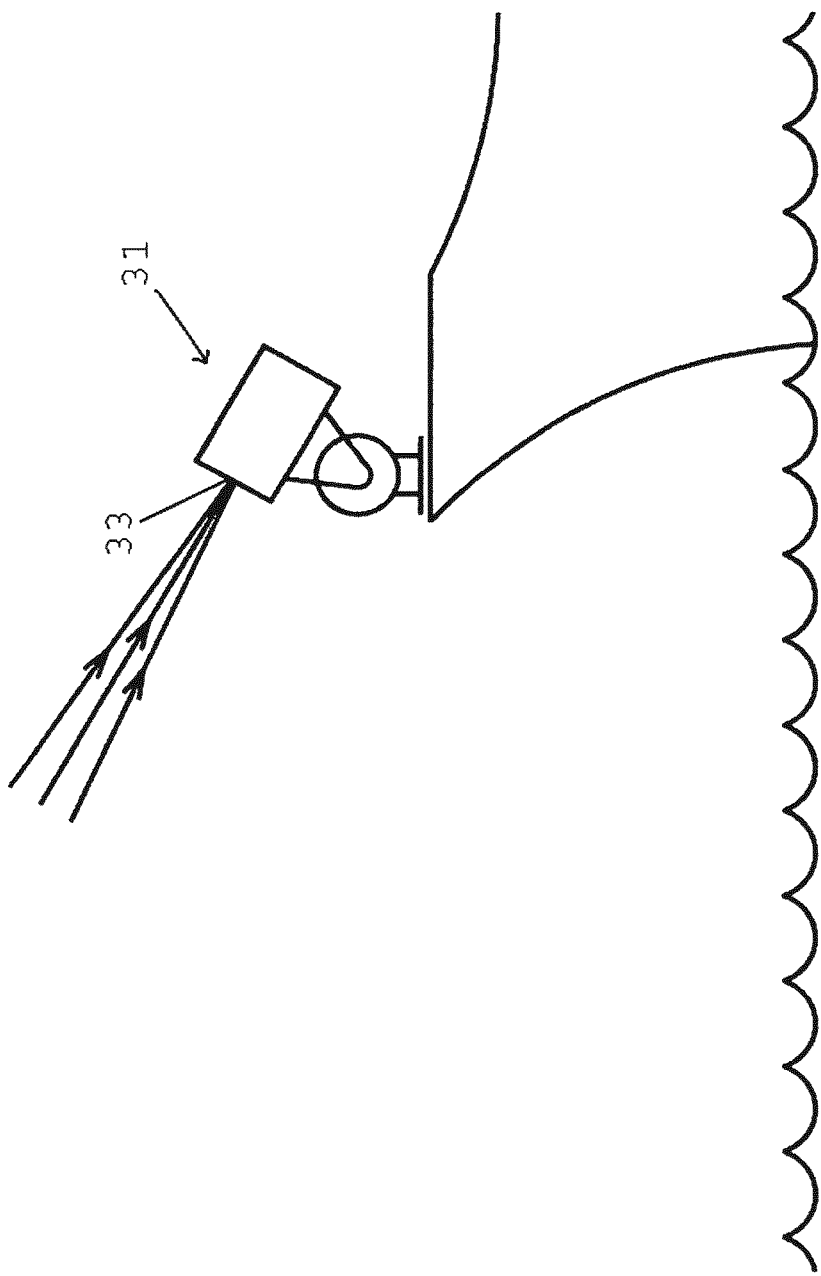
FIG. 10 is an illustration of the apparatus of this invention pointed to an elevated angle above the horizon.

FIG. 10 depicts use of infrared camera system 31 of the apparatus of this invention in a method for determining the downwelling sky flux that is required to correct out the reflected flux viewed by infrared camera 33. This method consists of measuring the infrared sky temperature at an elevation angle where the sky temperature is in measurement range of the infrared camera used (an IRT (infrared thermometer) could optionally be utilized), and then mapping this sky temperature to a zenith or desired near zenith value. Sensitivity to possible sources of error are explored, as care must be taken in the observations and calculations to avoid inducing error. The infrared camera system is pointed to an elevated angle above the horizon such that the cold sky temperature is on the lower end of the measurement scale of the infrared camera. This then gives a method of calculating the cold sky temperature at high elevation angles.

A stratified atmosphere is assumed. The opacity at the higher elevated angle is calculated from the brightness measurement at a lower elevation angle, mapped to the desired high elevation angle, and the high angle temperature calculated from the high angle opacity. The derivation below demonstrates how the downwelling emission can be mapped from one elevation angle to another, and assesses the errors that might be incurred.

The radiation intensity or Brightness Temperature observed at an IRT or infrared camera (IRC) from atmospheric radiation can be expressed using a modified form of the integral form of Chandrasekhar's Radiative Transfer Equation (RTE) for radiative propagation through an interactive medium:

$$T_B = \int_{IRC}^{\infty} T(s)\alpha(s)e^{(-\int_{IRC}^{s}\alpha(s')ds')}ds + T_{cosmic}e^{(-\int_{IRC}^{\infty}\alpha(s)ds)} \quad \text{(Chandrasekhar)}$$

where $T_B$ is the Brightness Temperature, the Blackbody Temperature,

IRC is the infrared camera position, $T_{cosmic}$ is the origin of emission from the Big Bang, T(s) is the atmospheric temperature at distance s from the IRC and α(s) is the atmospheric absorption at distance s from the IRC.

Optical depth or opacity tau is defined by the integral in the exponents in the above expression:

$$\tau = \int_{IR\ Camera}^{\infty} \alpha(s)ds \quad \text{(optical depth or opacity)}$$

We can linearize the above Fredholm equation by defining the Mean Radiating Temperature $T_{MR}$ of the intervening atmosphere from the Mean Value Theorem of Calculus and continuous or stepwise numerical integration. The Mean Radiating Temperature $T_{MR}$ is defined as:

$$T_{mr} = \frac{\int_0^{\infty} \alpha(s)T\delta s}{\int_0^{\infty} \alpha(s)\delta s} = \frac{\sum_{i=0}^{\infty} \alpha_i T_i \delta s_i}{\sum_{i=0}^{\infty} \alpha_i \delta s_i} \quad \text{(Mean Radiating Temperature)}$$

Thus:

$$T_B = (1-e^{-\tau})T_{mr} + T_{cb}e^{-\tau} \quad \text{(Linearized RTE)}$$

where $T_B$ is the temperature observed by the IRC. Opacity is then:

$$\tau = \ln\left(\frac{T_{mr} - T_{cosmic}}{T_{mr} - T_B}\right) \quad \text{(opacity)}$$

Opacity scales with air masses, that is, $\tau_{zenith} = \tau_{angle} \cos\theta$ where theta is the observation incidence angle measured from zenith. Thus:

$$T_B(\text{zenith}) = (1-e^{-\tau\theta\cos\theta})T_{mr} + T_{cb}e^{-\tau\theta\cos\theta} \quad \text{(zenith Brightness)}$$

As can be seen from the below differentiation of the above equation, $T_{MR}$(Mean Radiating Temperature) plays an important role, especially when brightness temperature $T_B$ is close to $T_{MR}$. On the other hand, the reflected sky flux is small, and some level of uncertainty can be tolerated.

$$dT_B = (-T_{cosmic}e^{-\tau} + e^{-\tau}T_{MR})\frac{(T_{cosmic} - T_B)T_{MR}}{(T_{mr} - T_B)(T_{mr} - T_{cosmic})}dT_{MR}$$

This Mean Radiating Temperature can be estimated on a monthly or seasonal basis for a given observation site, and is about 95% of the mean surface temperature.

Counterintuitively, the value of the Mean Radiating Temperature does not significantly change with elevation angle. Calculations of $T_{MR}$ utilizing NASA JPL's Radiative Transfer Code to process radiosonde soundings at widely disparate angles and several atmospheric opacities tau demonstrates that $T_{MR}$ differs by less than several degrees. This variation with elevation angle usually results in less than 0.01 C in the value reflected from the sea surface.

Figure 11:
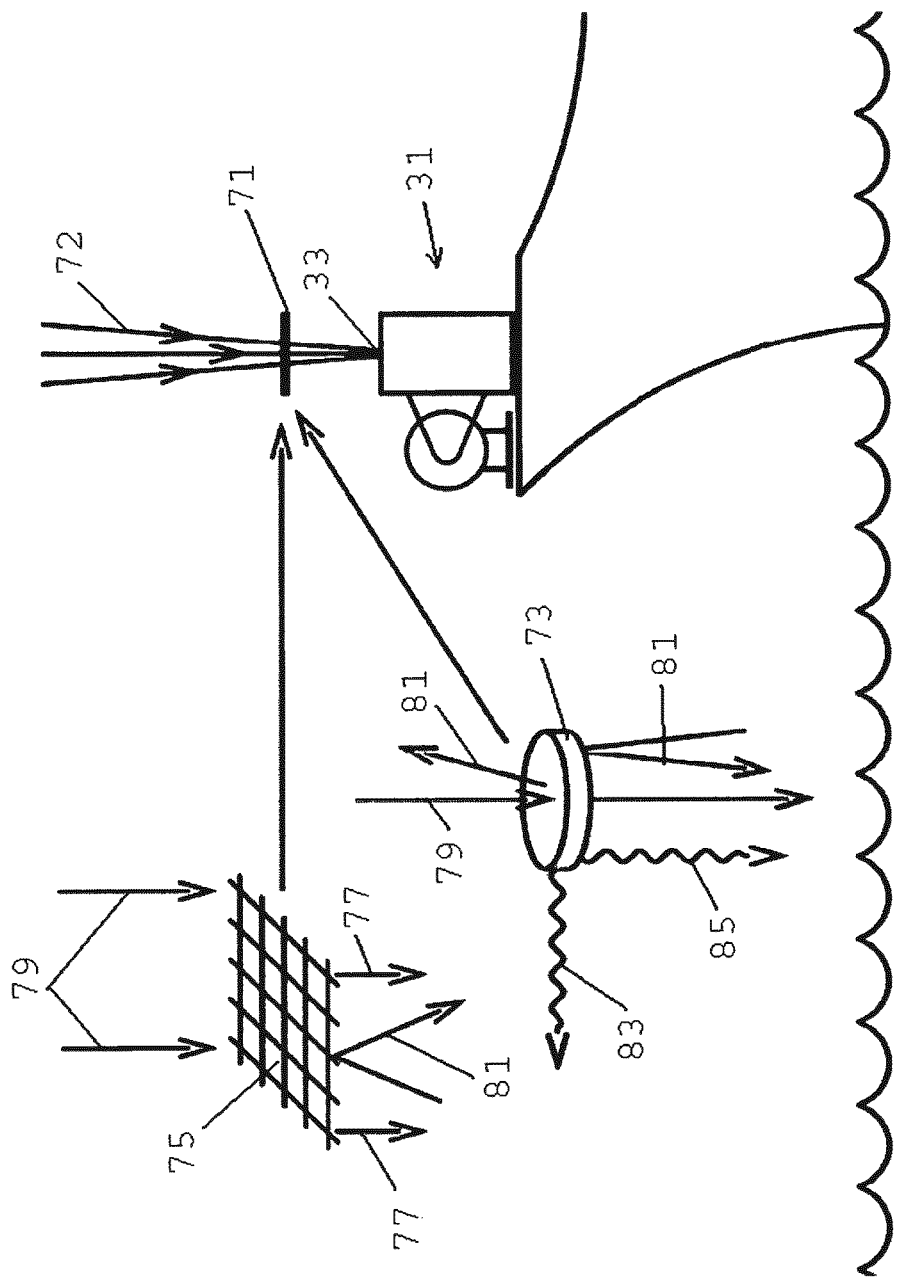
FIG. 11 depicts the infrared camera system pointed to a near zenith viewing through a neutral density filter or, alternatively, a blackbody mask.
Figure 12:
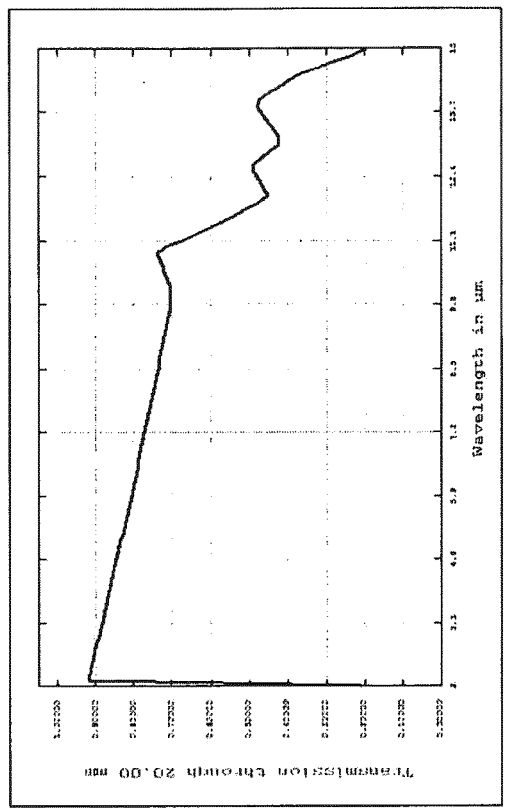
FIG. 12 is a transmission plot of a neutral density germanium filter.
Figure 13:
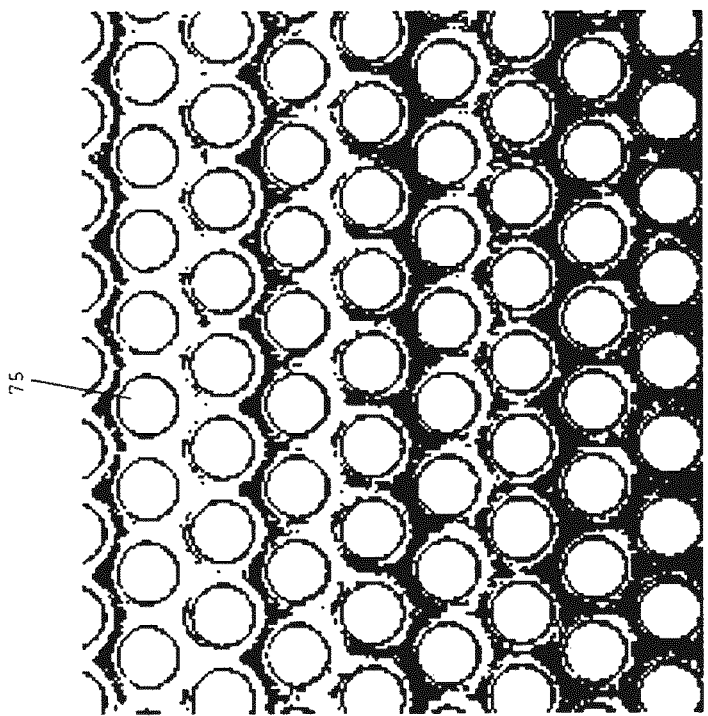
FIG. 13 is an image of blackbody mask of about 35% transmission for use with this invention.

Another means of measuring the zenith blackbody temperature is to insert an infrared window 71 in the optical path of observation of downwelling flux 72 for neutral density filter 73 or blackbody mask 75 of known temperature and losses and reflections as shown by FIG. 11. Herein is illustrated infrared camera system 31 with camera 33 pointed to a near zenith, viewing through neutral density filter 73 or, alternatively, a blackbody perforated mask 75 at window 71. This gives a method of directly measuring the cold sky temperature at high elevation angles whereby the transmitted or grid emitted flux 77 of the downwelling sky flux 79 is determinable. Reflected sky flux and upwelling flux 81 and filter absorbed flux 83 and emitted flux 85 are thus sorted. This increases the value of the combined flux of the cold sky and the masks, thereby bringing the flux temperature within the range of the camera, and can allow determination of blackbody sky temperatures well below the lower range of the camera. FIG. 12 is a transmission plot of a germanium neutral density filter 73 appropriate to the tasks of this invention, while FIG. 13 depicts a blackbody mask 75 of 35% transmission.

To identify the pixel in the infrared image that is least contaminated by the sky flux and is dominated by sea surface emission, and therefore from which it is relatively easy to determine the downwelling flux at the desired angle, the blackbody temperatures of the pixels in the image are sorted from warmest to coldest. Quality control algorithms are applied to eliminate pixels containing a reflection of the sun and containing sea foam or biological or other contaminants. Sun glint can occur in some pixels in the IR images of the sea under certain sun angles, camera FOV, ephemerides, and sea slopes. This glint will produce anonymously high temperatures in those IR camera pixels. The Sun subtends about ½ angular degree, and the glint can therefore occur over several adjacent 0.03 degree pixels. The Sun's photosphere is a 5800K blackbody in the visible region, and about 5100K at 10 microns. These brightnesses are greatly decreased by atmospheric absorption. The value in the vicinity of 10 microns is greatly reduced by the amount of total integrated atmospheric water vapor.

Figure 14:
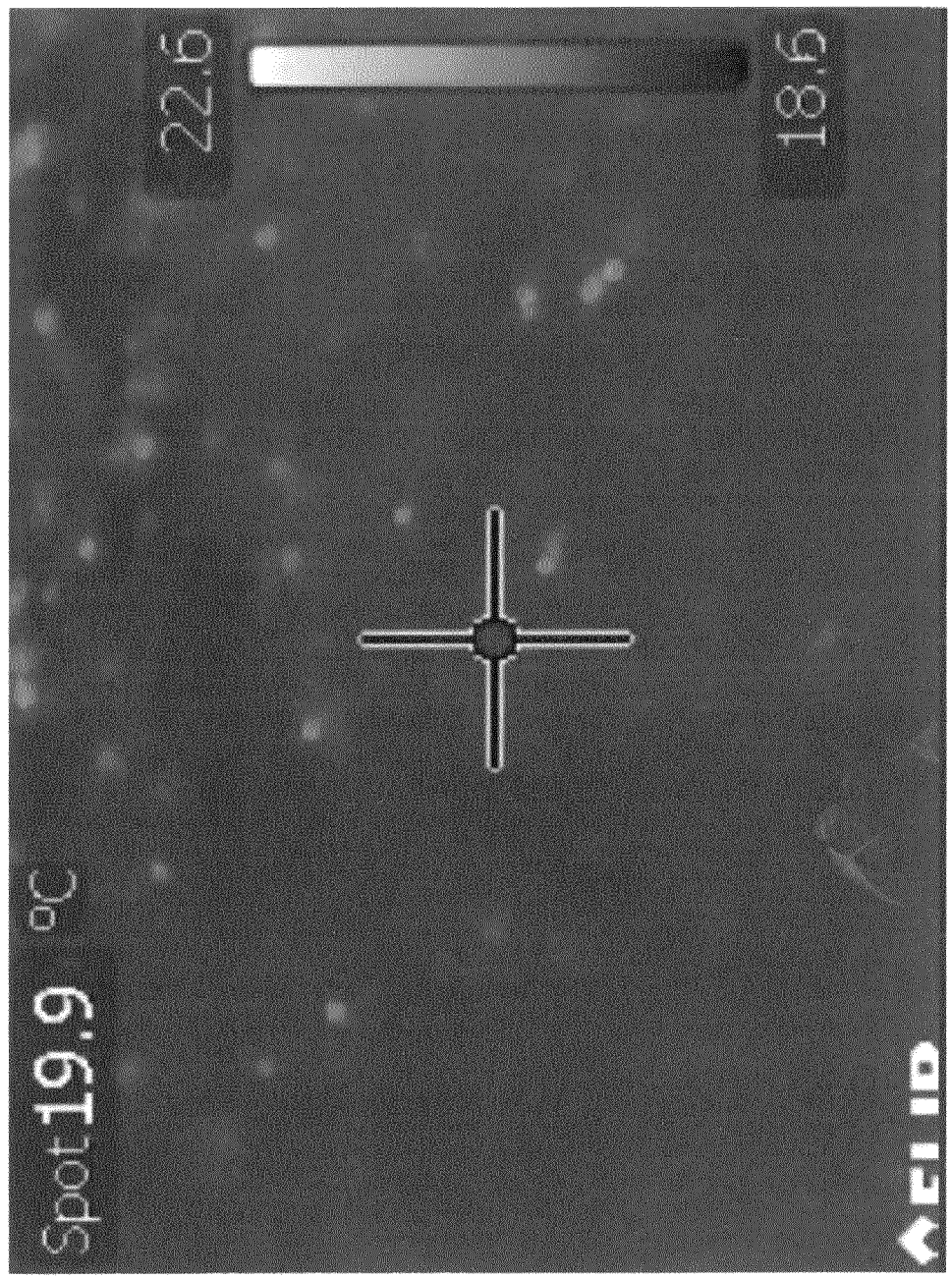
FIG. 14 is an image of the sea surface in the LWIR showing reflections of the Sun.

FIG. 14 is an LWIR image shot from the work deck of an ocean going vessel taken at near nadir showing sun glint off of the sea surface where the incidence angle between the sun and the pixel in the infrared image is bisected by the normal to the wave surface (using a FLIR T400 camera, with Sun and camera at approximately the same incidence angle; the bright spots, roughly 4 C warmer than the rest of the sea surface image, presumably being reflections of the Sun). The ~1% reflected brightness could be many Kelvins, depending upon atmospheric attenuation of the Sun's sea level LWIR flux, as compared with several K for the clear sky. A quality control (QC) algorithm that searches these anomalies, determines the time-transient nature in anomalous pixels in the time series of the image, and compares temperatures in adjacent pixels will be used to filter out such pixels as discussed below. A histogram may also identify the solar reflections, as the reflected solar images are several degrees above the bulk of the pixel temperatures. The solar ephemeris and angular relations of the FOV and azimuthal pointing of the LWIR camera might be utilized in an algorithm to aid in QC to remove or avoid solar specularity. An on-board inertial measurement system (IMU) of the profiling system can furnish compass heading, latitude and longitude, GMT, and camera point vector. The remaining warmest pixel is least contaminated under skies colder than the sea surface temperature.

Figure 15:
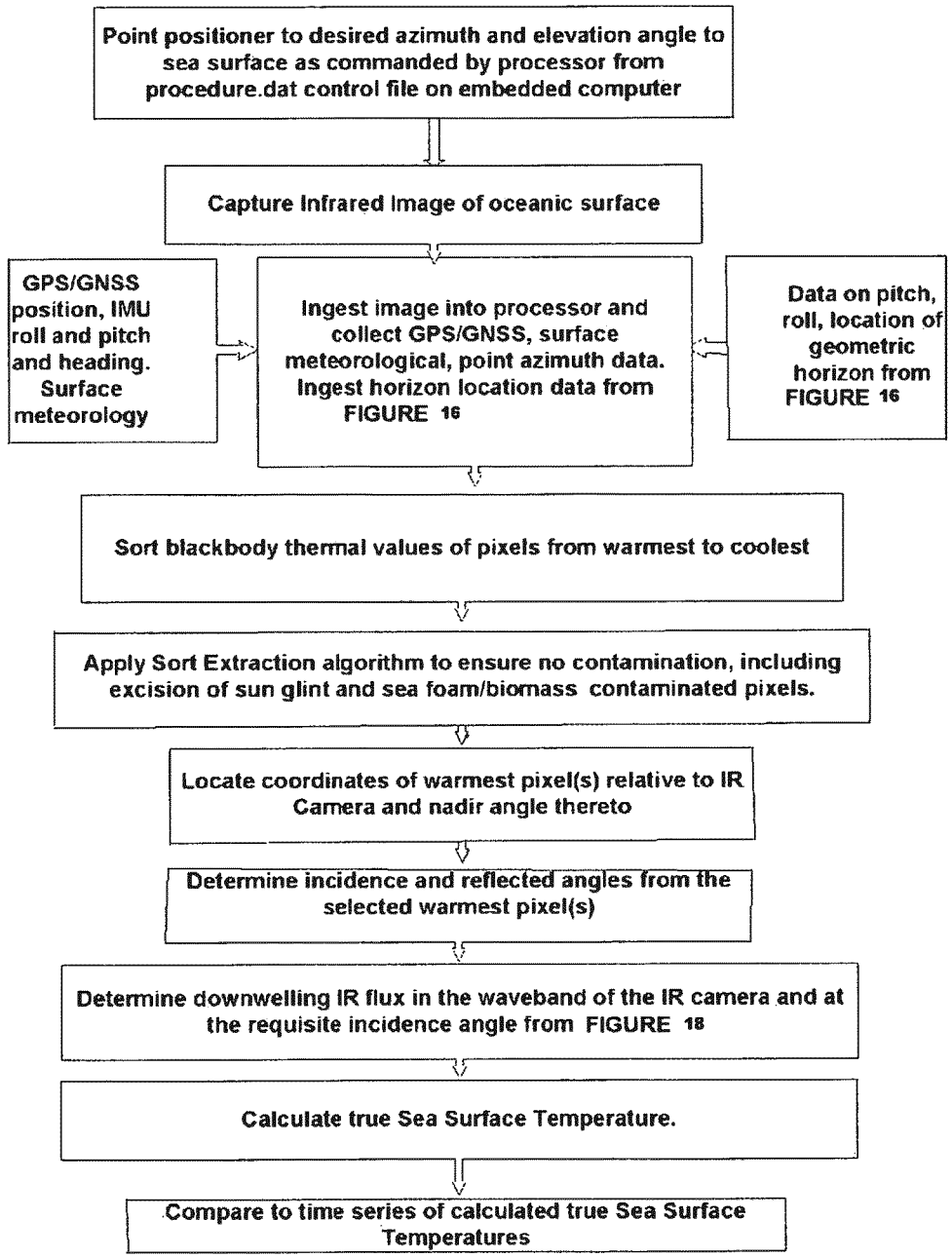
FIG. 15 is a flowchart illustrating steps in operational determination of sea surface temperature of this invention.

FIGS. 15 through 18 are flowcharts indicative of operational steps embodying the methods of this invention discussed above, including programming of the onboard processor and controllers discussed hereinbelow, necessary for accurate sea surface temperature retrieval. FIG. 15 describes a preferred embodiment of flow of processes utilized for the infrared sea surface temperature measurement system of this invention. The FOV of the infrared camera is captured as thermal values within the pixels in digital form. An infrared camera frame rate up to 9 Hz can be selected via onboard processor.

Information on the pitch and roll of the ship from an external source, for instance from the ship's data bus, or on-board from a self-contained IMU allows the positioner to be dynamically controlled to maintain a constant view angle with the ocean's surface. Due to the roll, pitch, and heave of the ship, the IMU is not in an inertial frame of reference system, and to determine the true gravitational vector and geometric horizon, the accelerations of the ship need to be subtracted out through long term averaging of the sinusoidal motions of the ship, fitting sinusoids to the accelerations, Fourier analysis of the accelerations, filtering such as Kalman, and other methods.

More particularly, operational retrieval of true sea surface temperature begins by pointing the camera positioner utilized to the desired azimuth and elevation angle to sea surface as commanded by the onboard processor from the procedure.dat control file of the embedded computer. Infrared image(s) of the oceanic surface are captured, the images ingested into (received by) the processor. GPS/GNSS (Global Positioning System/Global Navigation Satellite System), surface meteorological and positioner (point and azimuth) data from on board instruments are collected, and pitch roll and location of geometric horizon data (from FIG. 16) are calculated/received at the processor. Sorting of blackbody thermal values of pixels, from warmest to coolest, is applied and the sort extraction algorithm is utilized at the processor to ensure no contamination, including excision of sun glint and sea foam/biomass contaminated pixels. Coordinates of warmest pixel(s) in the image relative to IR Camera and nadir angle thereto are thus located, and incidence and reflected angles determined from the selected warmest pixel(s). Downwelling IR flux in the waveband of the IR camera and at the requisite incidence angle (from FIG. 18) is determined and true sea surface temperature then calculated. A time series of calculated true sea surface temperatures is repetitively compared.

Figure 16:
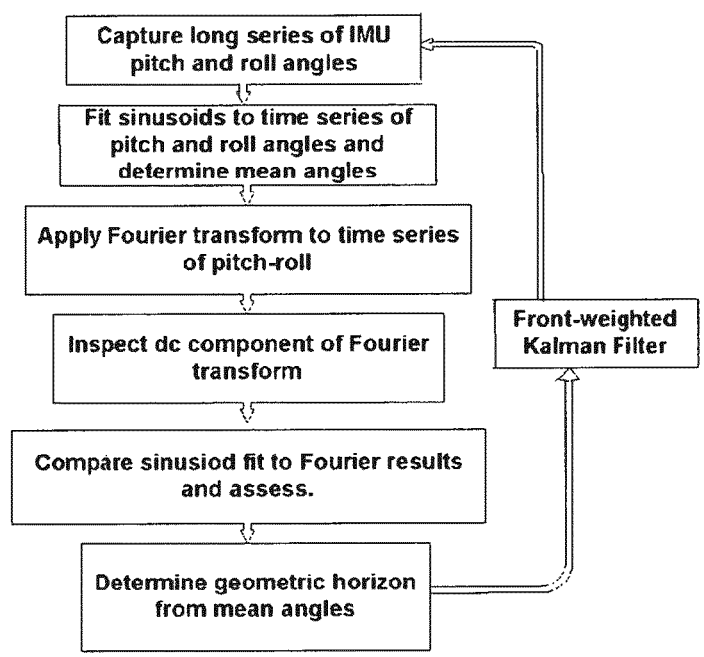
FIG. 16 is a flowchart illustrating steps to determining the position of the geometric horizon and the local gravitational vector by applying processing to data from an inertial measurement system associated with the apparatus of this invention.

The flowchart of FIG. 16 shows processes for determination the geometric horizon at the processor. As shown the steps in this process are applied for determining the inertial frame of reference. It also allows observation of the known vicinity of the oceanic horizon, thus enabling determination of refractivity, temperature, and water vapor profiles of the atmosphere if desired for other operations. Determination of geometric horizon proceeds by capture of a long series of IMU pitch and roll angles. The sinusoids are fit to the time series of pitch and roll angles and mean angles then determined. Fourier transform is applied to the time series of pitch-roll, and the dc component of the Fourier transform is inspected. Sinusoid fit is compared to Fourier results and assessed. The geometric horizon is determined from mean angles. A Front-weighted Kalman filter is applied the geometric horizon determination and used as an input to ongoing IMU pitch and roll angle series capture. Alternatively, long-term average of IMU pitch/roll could be used to find the true gravitational vector, or a combination of methods, combined via Optimal Estimation methods, for example.

Figure 17:
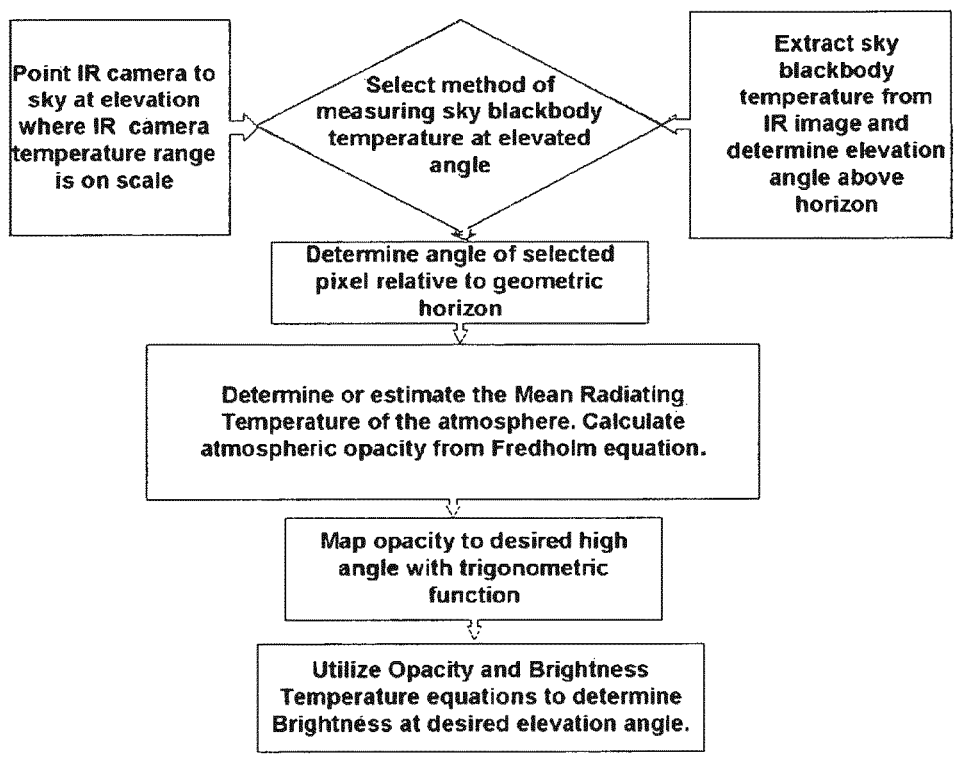
FIG. 17 is a flowchart illustrating steps for mapping low angle infrared camera measured sky brightness temperatures to higher elevation angles.

The angular relationships between the incidence angles of the brightest pixel in the FOV and the infrared camera point to this brightest pixel are determined at the processor using the steps in FIG. 17. Sky blackbody temperature is mapped to a high elevation angle. A method of measuring sky blackbody temperature at elevated angle is selected from the either the method of pointing the IR camera to the sky at an elevation where the IRC temperature range is on scale, or the method of extracting sky blackbody temperature from an infrared image and determining the elevation angle above horizon. The angle of a selected pixel relative to the geometric horizon (from FIG. 16) is determined. The Mean Radiating Temperature of the atmosphere is determine or estimated. The atmospheric opacity from the Fredholm equation is then calculated and opacity to the desired high angle is mapped using a trigonometric function. Opacity and brightness temperature equations are then used to determine brightness at desired the elevation angle.

Figure 18:
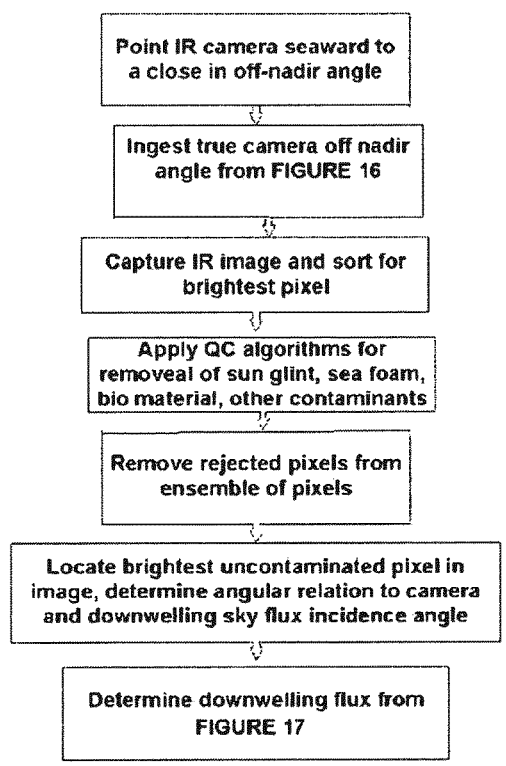
FIG. 18 is a flowchart demonstrating steps for selection of pixel(s) within the infrared camera image for processing into sea surface temperature.
Figure 19:
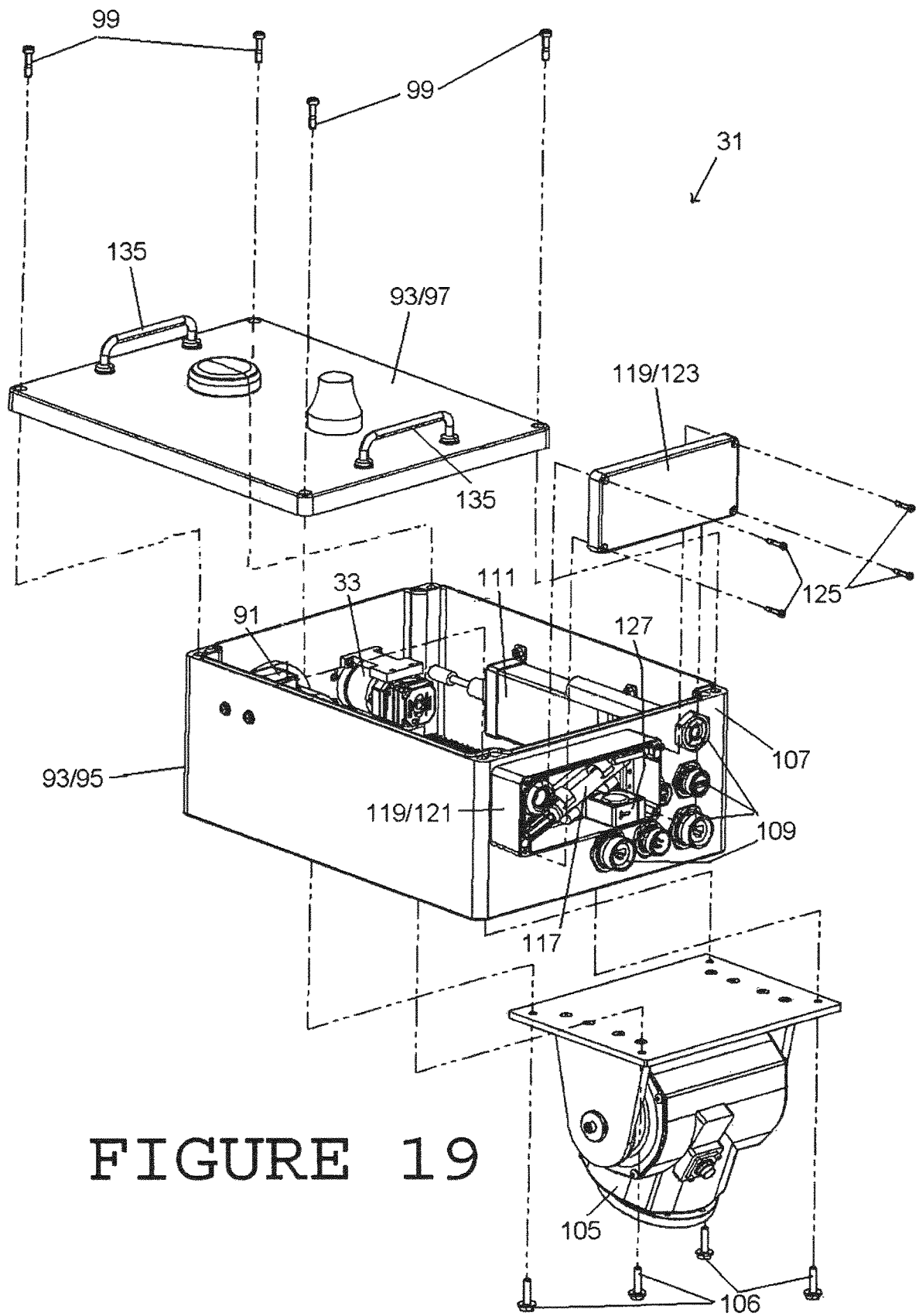
FIG. 19 is an exploded view of a preferred embodiment of the apparatus of this invention.
Figure 20:
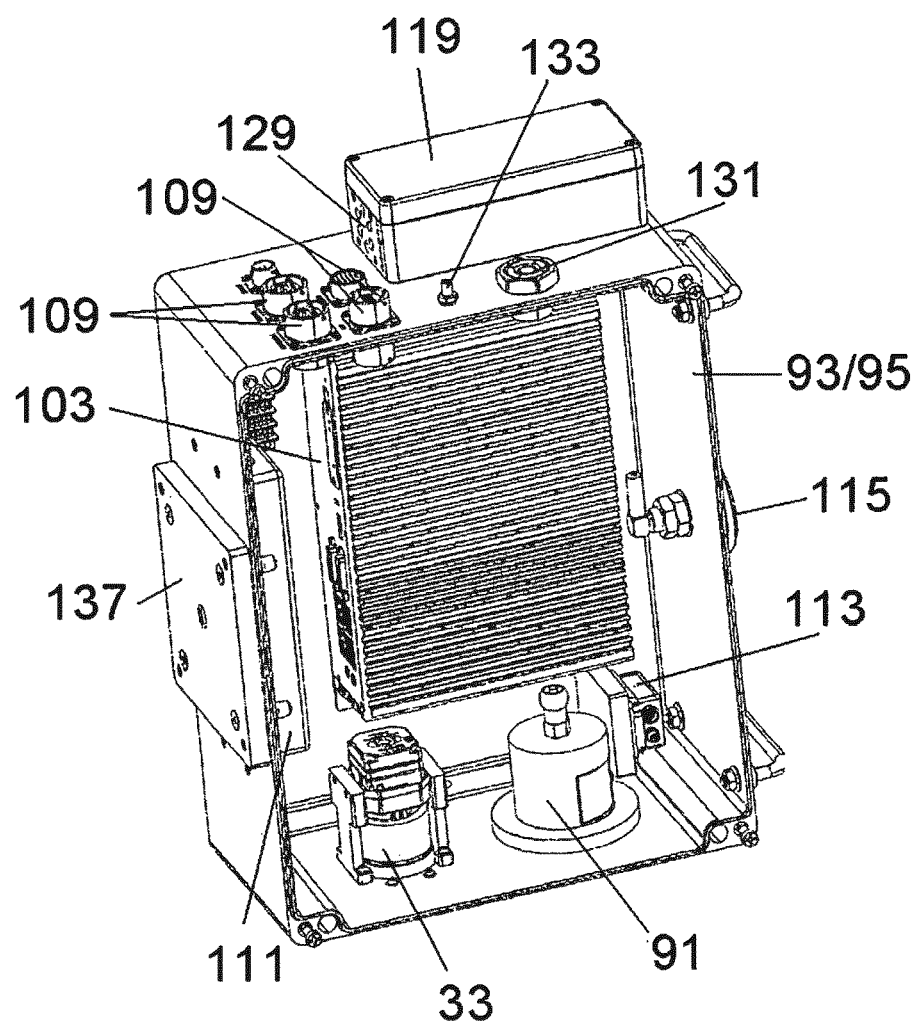
FIG. 20 is a perspective view of the preferred embodiment of the apparatus of this invention shown in FIG. 19 with the cover removed.
Figure 21:
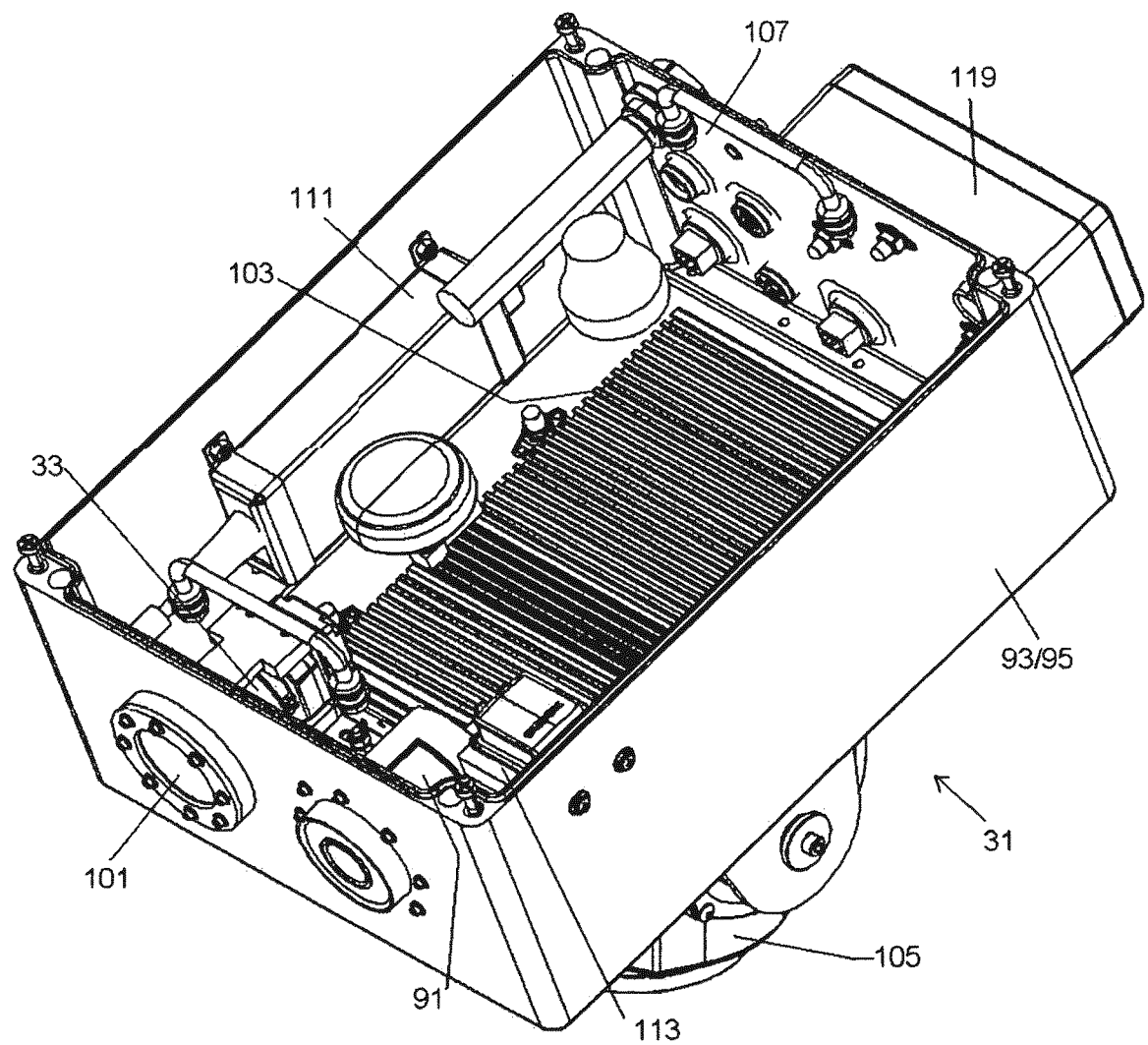
FIG. 21 is a second perspective view of the preferred embodiment of the apparatus of this invention shown in FIG. 19 without the cover.
Figure 22:
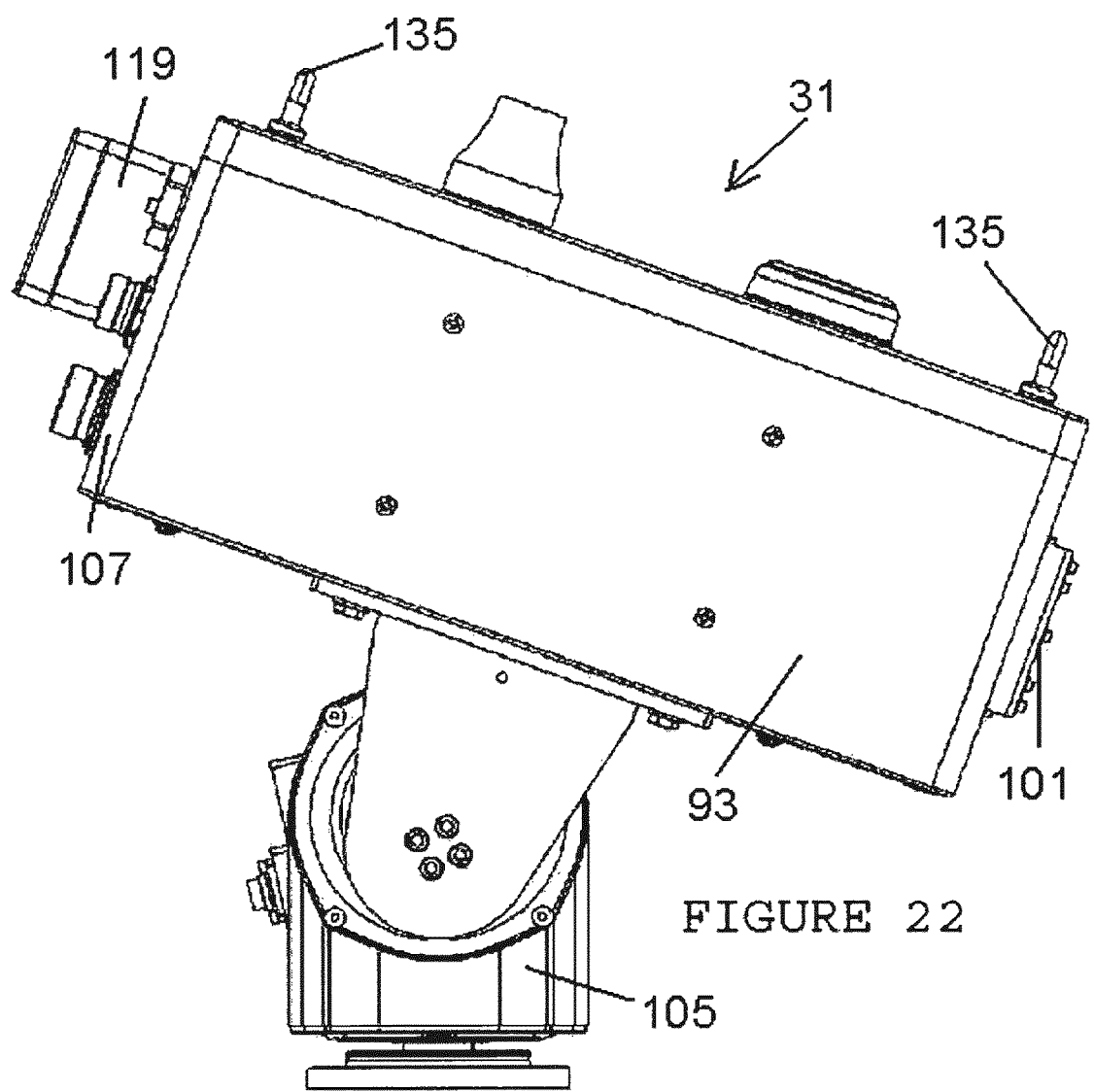
FIG. 22 is a side view of the preferred embodiment of the apparatus of this invention shown in FIG. 19.

The process for determining the desired high angle downwelling flux from lower elevation angle infrared camera observations is shown in FIG. 18. To determine the warmest pixel, the IRC is pointed seaward to a close by off-nadir angle to preclude reflections of the image of the platform (ship for example) structure. The true camera off nadir angle is received (via FIG. 16). The IRC captures infrared image and sorts for the brightest pixel. Quality control (QC) algorithms are applied for removal of sun glint, sea foam, bio material and other contaminants and rejected pixels are removed from the ensemble of pixels. The brightest uncontaminated pixel in the image is located, and angular relation to the camera and the downwelling sky flux incidence angle is determined. Downwelling flux is then determined (see FIG. 17).

A preferred embodiment of system 31 of the apparatus of this invention is illustrated in FIGS. 19 to 23. The preferred embodiment utilizes the 8 to 14 micron band of infrared camera 33 (for example, an ICI model 8640 camera with a 25 degree field of view). A visible image camera 91 is also provided (for example, a DAHUA IPC-HFW1420SP). The cameras are mounted in hermetic enclosure 93 such as a ROSE BOPLA ALS 01210 to protect from the harsh marine environment. Enclosure 93 includes main case 95 and lid 97 sealably securable to the main case using bolts 99. Infrared camera 33 views through window 101 such as a germanium window (for example, a KNIGHT OPTICAL WGE6004-C 60 mm diameter hard carbon and antireflective coated 7-14 um germanium window).

The enclosure contains embedded processor 103 (such as a RUGGED SYSTEMS ECS-4500 computer) that performs system housekeeping functions, controls the operational process steps of the sea surface temperature measurement system hereinabove, captures data from the system subsystems, determines the geometric horizon, obtains data regarding camera position and responsive thereto controls positioner 105 (connected by bolts 106 to enclosure 93) operations, processes the infrared images to determine true sea surface temperature, and communicates the data via Ethernet cable, fiber optics, Wi-Fi or other serial format via interface panel 107 to a selected central site. Panel 107 preferably uses hermetic connectors mounted through a panel of the enclosure (for example GLENAIR hermetic stainless steel circular connectors 109) for connections to Ethernet, elevation-over-azimuth PoE positioner, 12-32 vdc or 90-260 vac, USB, and video. Power supply 111 is mounted on board.

The internal subsystems include an IMU 113 such as a XSENS MTI-G-710 series Inertial Measurement Unit to determine the pointing attitude of the infrared camera, capture global navigation system satellite (GNSS) position and velocity via antenna 115, and determine heading of the motion of the ship. Surface temperature and relative humidity are measured by sensor 117 (for example, a ROTRONIC HC2A sensor probe) mounted in a separate attached and ventilated enclosure 119 (including main case 121 and lid 123 held by bolts 125). The sensor probe enclosure is ventilated with a small fan 127 drawing in uncontaminated air through a filtered intake 129 by exhausting rather than inputting sample air thereby avoiding heating from the fan operation. Various additional features which may be employed include the GNSS antenna 115, a breathing desiccator mount 131 (AGM, for example, with indicator and pressure differential cracking valve), and a Schrader valve port 133 for pressure testing. Handles 135 are provided for handling and storage operations, and mounting plate 137 accommodates mounting to the positioner. Signal (communication, control and data) and power routing are all accomplished using selected conventional I/O cabling and devices. The apparatus of this invention is designed to operate on 22 to 32 vdc, a common ship board voltage that is not subject to the safety requirements of voltages above 48 volts, or 90 to 260 vac.

The pan-tilt PoE positioner 105 responsive to the processor/subsystems, such as a J-SYSTEMS JPTH-35PoE articulated elevation-over-azimuth positioner, is preferably used and is a self-contained positioner without external controller. It preferably has a high IP rating, incorporates serial command interfacing, has an elevation range for −90 to +60 angular elevation degrees, is corrosion resistant, and has sufficient payload torque capacity and MilSpec environmental specification suitable to this task. The positioner enables viewing at chosen downward or upward looking angles.

Figure 1:
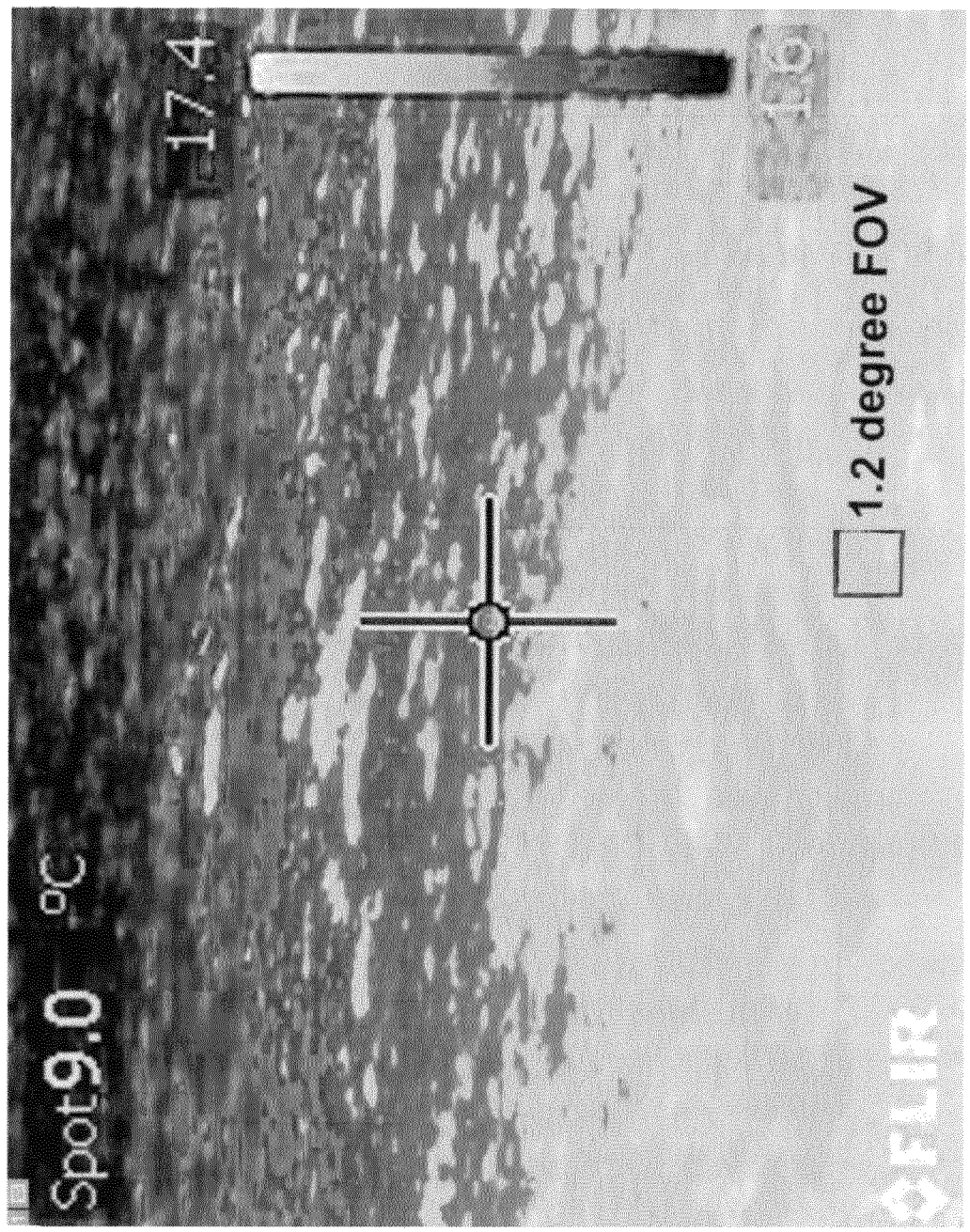
FIG. 1 is a long wave infrared (LWIR) image of the ocean taken from the gunwale of a vessel with an infrared camera.
Figure 2:
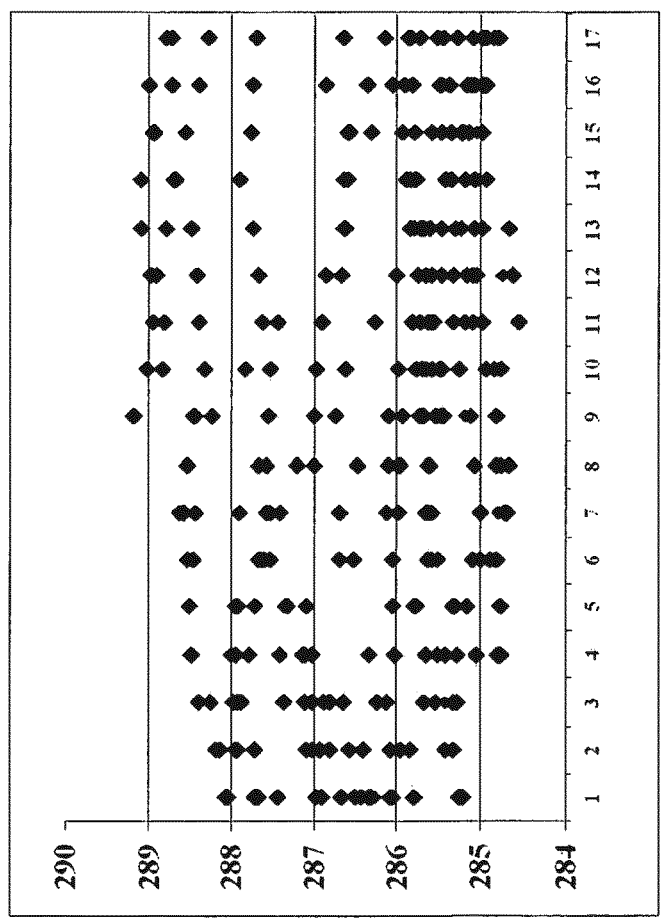
FIG. 2 contains LWIR infrared camera sea surface temperature measurements in a 1.2×1.2 degree FOV area (ISAR~FOV) at the bottom center of the image in FIG. 1.

The infrared measurement system can therefore be directed to various azimuth angles and incidence angles and accommodates selected azimuth point. The preferred installation location shipboard is in the bow area of a ship as illustrated by FIG. 1 such that undisturbed oceanic surface can be observed free of the water movement and mixing caused by the ship passage. Alternatively, the system can be mounted on the ship superstructure or any location where a clear view of the sea surface ahead of the bow wave is available. Thus, an undisturbed image of the reflected downwelling thermal sky radiation in the field of view of the infrared camera system as reflected by the sea surface and thermal radiation emitted by the sea surface are received by the infrared camera system. These two combined flux sources are mathematically separated by calculations of the processor to extract the true sea surface temperature.

Error sources associated with the hardware and methods of this preferred embodiment are shown in below. The expected error upon the sea surface temperature determination in utilizing the neutral density filter or blackbody screen for the Infrared Cameras Incorporated Model 8640 and preferred hardware and methods is presented in TABLE 1.

TABLE 1

Estimated total Square Root of Sum of Squares error in sea surface temperature considering only the neutral density filter measurement method and blackbody screen method errors. Note that the infrared camera is the dominating error.

| Error Source 35% transmission | Magnitude of Maximum Uncertainty | Induced sea surface temperature Error |
|---|---|---|
| ND filter transmission/loss in band | 3% | 0.028 C. |
| Temperature of ND filter | 5 C. | 0.08 |
| Temperature of blackbody screen | 5 C. | 0.08 C. |
| Reflected FOV | 4 C. | 0.032 C. |
| 8640 infrared camera | NEDT, delta T | 0.30 C. |
| Total Estimated Error, SRSS | | 0.32 C. |
| SRSS if infrared camera could be calibrated to 0.2 C. | | 0.22 C. |

The total system expected errors associated with the hardware and methods of this preferred embodiment utilizing the Infrared Cameras Incorporated Model 8640 and preferred hardware and methods is presented in TABLE 2.

TABLE 2

Estimated total error in sea surface temperature with zenith-mapping measurement method. 200 C. sea surface temperature-sky difference assumed. The camera error dominates.

| Error Source | Parameter and Maximum Uncertainty Magnitude | Induced sea surface temperature Error |
|---|---|---|
| Mean Radiating Temperature | $T_{MR}$ 20 degrees | 0.1 C. |
| Incidence/Reflection Angles | Theta 10 degrees | 0.045 C. |
| Index of Refraction | n +/− 0.05 n-units | 0.03 C. |
| 8640 infrared camera | NEDT, delta T | 0.30 C. |
| Misestimation of zenith-mapped downwelling flux | Reflected downwelling flux | 0.025 C. |
| Total Estimated Error, Square Root Sum of Squares (SRSS) | | 0.32 C. |
| SRSS if infrared camera could be calibrated to 0.2 C. | | 0.23 C. |

As may be appreciated from the foregoing, high accuracy apparatus and methods are disclosed for sea surface temperature measurement (absolute accuracy of the order of magnitude of 0.3 C and perhaps less has been obtained in testing). The infrared camera apparatus is also capable of determining vertical profiles of tropospheric temperature, water vapor, and refractivity from the surface to 10 km of altitude, as described in U.S. patent application Ser. No. 16/350,267. Thus the system can perform multiple functions.

What is claimed is:
1. A method for remote measurement of sea surface temperature comprising the steps of:

capturing a time series of pitch and roll angles from an inertial measurement unit:

fitting sinusoids to the time series of pitch and roll angles and determining mean angles therefrom;

applying Fourier transform to the time series of pitch and roll angles and inspecting the dc component of the Fourier transform;

comparing and assessing sinusoid fit to Fourier transform results; and determining geometric horizon from the mean angles;

capturing a multi-pixel image in selected wavebands of a selected area of sea surface at a selected incidence angle, each pixel of the image having a fraction of a degree field-of-view width;

sorting blackbody thermal values of the pixels, from warmest to coolest;

locating coordinates of the warmest pixels relative to position of image capture and nadir angle thereto;

determining incidence and reflected angles from a selected warmest pixel; and determining downwelling infrared flux in the wavebands and at the incidence angle and utilizing determination of downwelling infrared flux to provide a corrected calculation of true sea surface temperature.

2. The method of claim 1 wherein the step of capturing a multi-pixel image includes positioning an infrared camera capable of image capture in the 8 to 14 micron thermal band above the sea surface.

3. The method of claim 2 further comprising:

pointing the camera to a desired azimuth and elevation angle to the sea surface responsive to a processor;

receiving Global Positioning System/Global Navigation Satellite System, surface meteorological, point, azimuth and elevation angle data at the processor;

receiving pitch roll and location of geometric horizon data at the processor;

utilizing a processing algorithm at the processor to extract contaminated pixels; and repeatedly comparing a time series of corrected calculation of sea surface temperatures to enhance system performance.

4. The method of claim 1 further comprising the step of processing the pixels to determine optimum segments of the image to utilize and correcting for influence of contaminating reflection of the downwelling flux from the sky.

5. The method of claim 1 wherein the fraction of a degree field-of-view width of each pixel thus spans only a few millimeters of wave surface.

6. The method of claim 1 further comprising the steps of:

mapping sky blackbody temperature to a selected high elevation angle;

selecting a method of measuring sky blackbody temperature at the selected high elevation angle;

determining angle of the warmest pixel relative to the geometric horizon;

determining or estimating Mean Radiating Temperature of the atmosphere;

calculating atmospheric opacity; and mapping opacity to the selected high elevation angle and using opacity and brightness temperature processing to determine brightness at the selected high elevation angle.

7. The method of 1 further comprising determining a desired high angle downwelling flux from lower elevation angle observation.

8. A method for accurate measurement of physical temperature of sea surface skin comprising the steps of:

calibrating a passive noncontact infrared thermal 8 to 14 micron band multi-pixel camera capable of capturing a plurality of pixels in each captured image of its field of view to express thermal blackbody temperature of each of the pixels;

directing the field of view of the camera to the sea surface at a known incidence angle and capturing an image or images thereof, wherein the camera field of view pixel width is a fraction of a degree thus spanning only a few millimeters of the sea surface, and sending data indicative thereof to a processor;

utilizing angle of a viewed wave surface in each pixel, view angle of the infrared camera onto the wave surface in each pixel, and angle of the reflected view of the sky in each pixel to determine the flux emitted from the sea surface and reflected sky flux in each pixel at the processor; and obtaining corrected sea surface skin temperature at the processor by separating the values of emitted flux from the first several microns of the sea surface skin and values of variable flux from sky reflected from the wave surface angles in the field of view of the camera in a selected pixel and processing accordingly.

9. The method of claim 8 further comprising controlling camera view position using real time data from an inertial measurement unit and a camera positioning unit responsive thereto received at the processor.

10. The method of claim 9 further comprising the steps of receiving Global Positioning System/Global Navigation Satellite System, surface meteorological, point, azimuth, elevation angle and Solar ephemeris data at the processor, and utilizing data received at the processor to extract contaminated pixels.

11. The method of claim 8 wherein determinations of sea surface skin temperature accurate to about 0.3 C are enabled.

12. The method of claim 8 further comprising the steps of receiving surface meteorological data at the processor, and utilizing data received at the processor to extract contaminated pixels.

13. The method of claim 8 wherein the known incidence angle is between about an orthogonal value of 0.008 degrees to 20 degrees of normal to the wave surface.

14. The method of claim 8 further comprising:

mounting the multi-pixel camera in a hermetic enclosure;

wherein the processor is a signal storage and processing unit, and mounting the processing in the hermetic enclosure in communication with the multi-pixel camera;

mounting an inertial measurement unit in the hermetic enclosure and in communication with the storage and processing unit and connected for receipt of Global Navigation Satellite System position and velocity and determination of platform movement;

mounting a surface air temperature and relative humidity probe with the hermetic enclosure and in communication with the storage and processing unit; and connecting a pan-tilt positioner to the hermetic enclosure and in communication with and operationally responsive to the storage and processing unit.

15. The method of claim 14 where the multi-pixel camera has a 25 degree field of view calibrated to express thermal blackbody temperature of each pixel in the field of view.

16. The method of claim 14 further comprising a mounting germanium window in an opening of the hermetic enclosure at a location so that the multi-pixel camera views therethrough.

17. The method of claim 14 wherein the storage and processing unit performs system housekeeping functions, controls and performs operational process steps of sea surface temperature measurement, captures data from the multi-pixel camera, the surface air temperature and relative humidity probe, and the pan-tilt positioner, determines geometric horizon, controls the pan-tilt positioner operations, and communicates data via output ports.

18. The method of claim 14 further comprising accommodating measurement of zenith downwelling blackbody temperature at the hermetic enclosure using one of a neutral density filter and blackbody mask of known temperature, losses and reflections.

19. The method of claim 14 further comprising locating a Global Navigation Satellite System antenna port at the hermetic enclosure, a breathing desiccator mount at the hermetic enclosure, a Schrader valve port for pressure testing at the hermetic enclosure, an onboard power supply in the hermetic enclosure, and mounting a visible band camera in the hermetic enclosure adjacent a view port therefor and communicating with the storage and processing unit.

* * * * *